US011481954B2

(12) United States Patent
McCombe et al.

(10) Patent No.: US 11,481,954 B2
(45) Date of Patent: Oct. 25, 2022

(54) SYSTEMS AND METHODS FOR 3-D SCENE ACCELERATION STRUCTURE CREATION AND UPDATING

(71) Applicant: Imagination Technologies Limited, Kings Langley (GB)

(72) Inventors: James A. McCombe, San Francisco, CA (US); Aaron Dwyer, San Francisco, CA (US); Luke T. Peterson, San Francisco, CA (US); Neils Nesse, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/165,347

(22) Filed: Feb. 2, 2021

(65) Prior Publication Data

US 2021/0183130 A1    Jun. 17, 2021

Related U.S. Application Data

(63) Continuation of application No. 16/245,088, filed on Jan. 10, 2019, now Pat. No. 10,930,052, which is a
(Continued)

(51) Int. Cl.
*G06T 15/06* (2011.01)
*G06T 17/00* (2006.01)
(Continued)

(52) U.S. Cl.
CPC .............. *G06T 15/06* (2013.01); *G06T 15/08* (2013.01); *G06T 15/80* (2013.01); *G06T 17/00* (2013.01);
(Continued)

(58) Field of Classification Search
CPC ......... G06T 15/06; G06T 15/80; G06T 17/10; G06T 17/00; G06T 15/08; G06T 2210/12; G06T 2210/32
See application file for complete search history.

(56) References Cited

U.S. PATENT DOCUMENTS 6,597,359 B1    7/2003  Lathrop
7,034,825 B2    4/2006  Stowe et al.
(Continued)

FOREIGN PATENT DOCUMENTS

CN    101192310 A    6/2008
CN    102282591 A    12/2011

OTHER PUBLICATIONS

Fabianowski B., Dingliana J.: Compact BVH storage for ray tracing and photon mapping. In Eurographics Ireland 2009 (2009), pp. 1-8) (Year: 2009).*
(Continued)

*Primary Examiner* — William A Beutel
(74) *Attorney, Agent, or Firm* — Potomac Law Group, PLLC; Vincent M DeLuca

(57) ABSTRACT

Systems and methods for producing an acceleration structure provide for subdividing a 3-D scene into a plurality of volumetric portions, which have different sizes, each being addressable using a multipart address indicating a location and a relative size of each volumetric portion. A stream of primitives is processed by characterizing each according to one or more criteria, selecting a relative size of volumetric portions for use in bounding the primitive, and finding a set of volumetric portions of that relative size which bound the primitive. A primitive ID is stored in each location of a cache associated with each volumetric portion of the set of volumetric portions. A cache location is selected for eviction, responsive to each cache eviction decision made during the processing. An element of an acceleration structure accord-
(Continued)

ing to the contents of the evicted cache location is generated, responsive to the evicted cache location.

20 Claims, 12 Drawing Sheets

Related U.S. Application Data continuation of application No. 15/251,732, filed on Aug. 30, 2016, now Pat. No. 10,217,267, which is a continuation of application No. 14/248,033, filed on Apr. 8, 2014, now Pat. No. 9,430,864, which is a continuation of application No. 13/567,033, filed on Aug. 4, 2012, now Pat. No. 8,717,357.

(60) Provisional application No. 61/515,801, filed on Aug. 5, 2011.

(51) Int. Cl.
    *G06T 15/08*     (2011.01)
    *G06T 15/80*     (2011.01)
    *G06T 17/10*     (2006.01)

(52) U.S. Cl.
    CPC .......... *G06T 17/10* (2013.01); *G06T 2210/12* (2013.01); *G06T 2210/32* (2013.01)

(56) References Cited

U.S. PATENT DOCUMENTS

| | | | |
|---|---|---|---|
| 7,145,562 | B2 | 12/2006 | Schechter et al. |
| 7,969,434 | B2 | 6/2011 | Peterson et al. |
| 8,018,457 | B2 | 9/2011 | Peterson et al. |
| 8,188,997 | B2 | 5/2012 | Dammertz et al. |
| 8,570,322 | B2 | 10/2013 | Hanika et al. |
| 2007/0182732 | A1 | 8/2007 | Woop et al. |
| 2008/0192050 | A1 | 8/2008 | Schardt et al. |
| 2008/0204451 | A1 | 8/2008 | Im et al. |
| 2009/0167763 | A1 | 7/2009 | Waechter et al. |
| 2010/0033482 | A1 | 2/2010 | Zhou et al. |
| 2010/0060634 | A1 | 3/2010 | Wald et al. |
| 2010/0238169 | A1 | 9/2010 | Fowler et al. |
| 2010/0332523 | A1* | 12/2010 | Peterson ............. G06F 16/2458 707/769 |
| 2011/0043521 | A1* | 2/2011 | Smyth .................... G06T 15/06 345/424 |
| 2013/0033507 | A1 | 2/2013 | Garanzha et al. |

OTHER PUBLICATIONS

Fabianowski, B. and Dingliana, J. (2009), Interactive Global Photon Mapping. Computer Graphics Forum, 28: 1151-1159. https://doi.org/10.1111/j.1467-8659.2009.01492.x (2009) (Year: 2009).*
Christensen et al.,"An Irradiance Atlas for Global Illumination in Complex Production Scenes," Eurographics Symposium on Rendering, 2004, 10 pages.
(*Note: copy of NPL in parent apn).

* cited by examiner

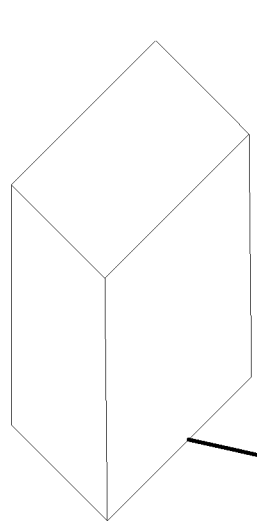
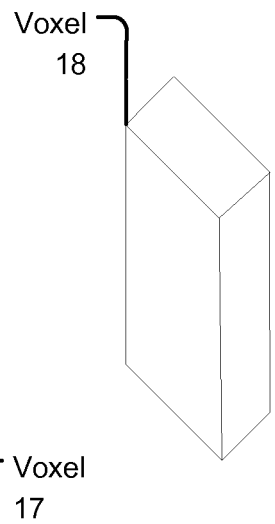
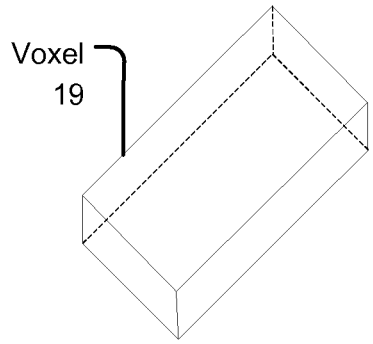
FIG. 4D  FIG. 4E  FIG. 4F
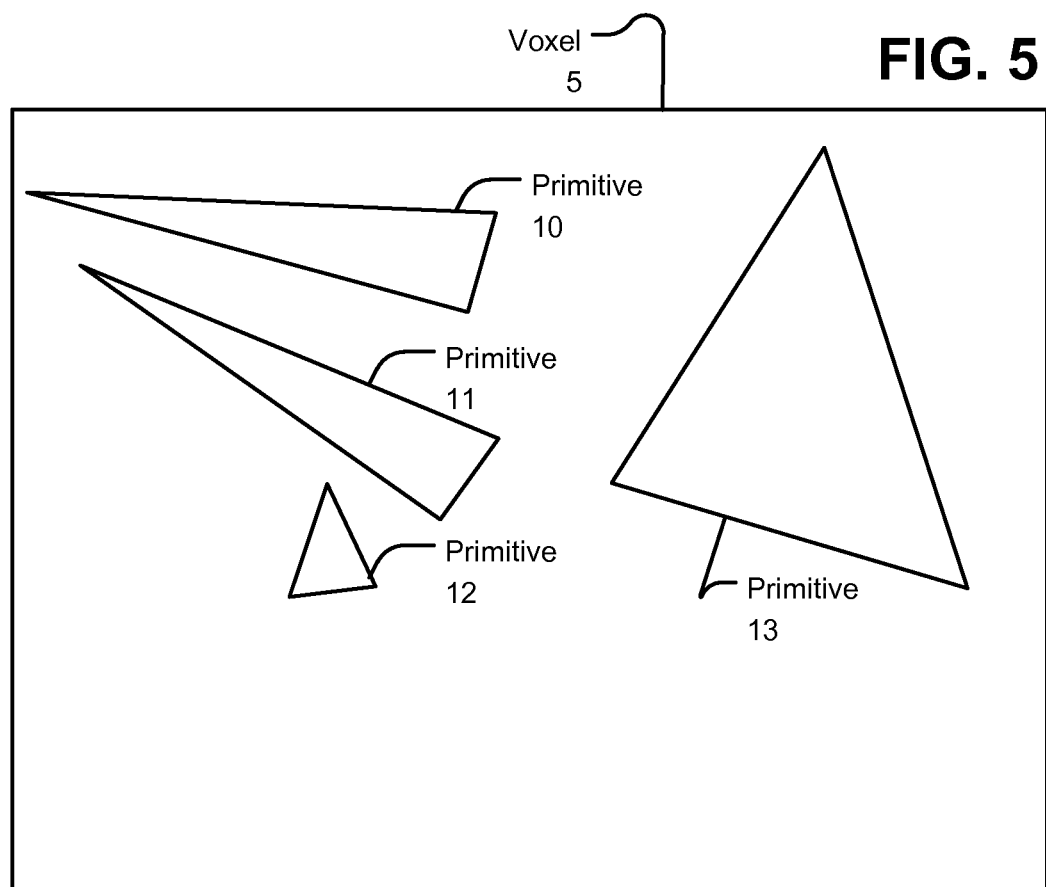
FIG. 5

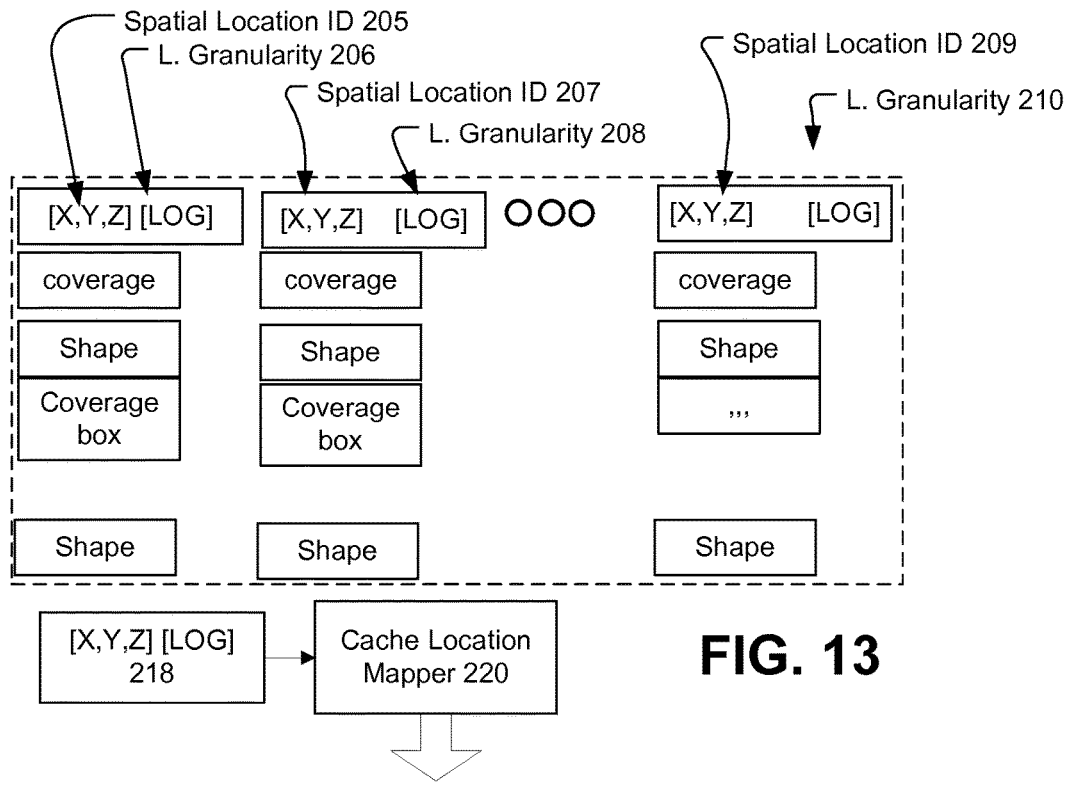
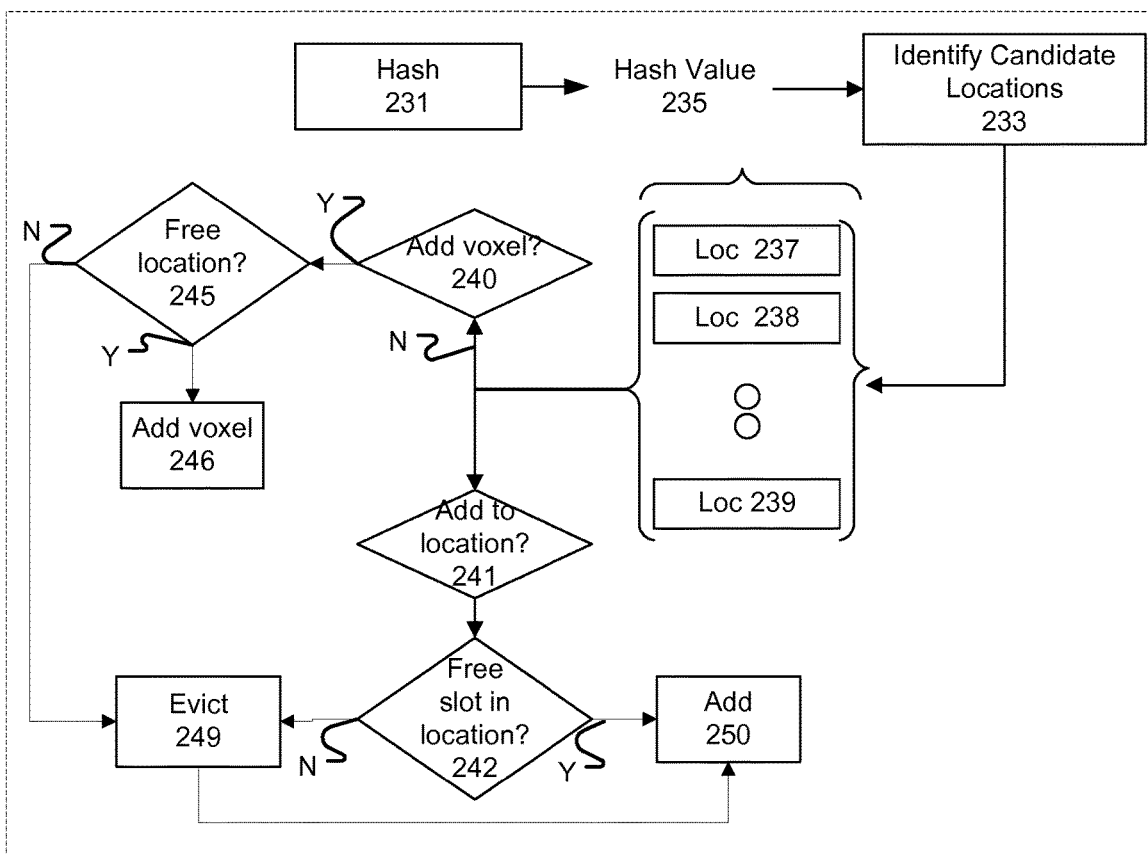
FIG. 13

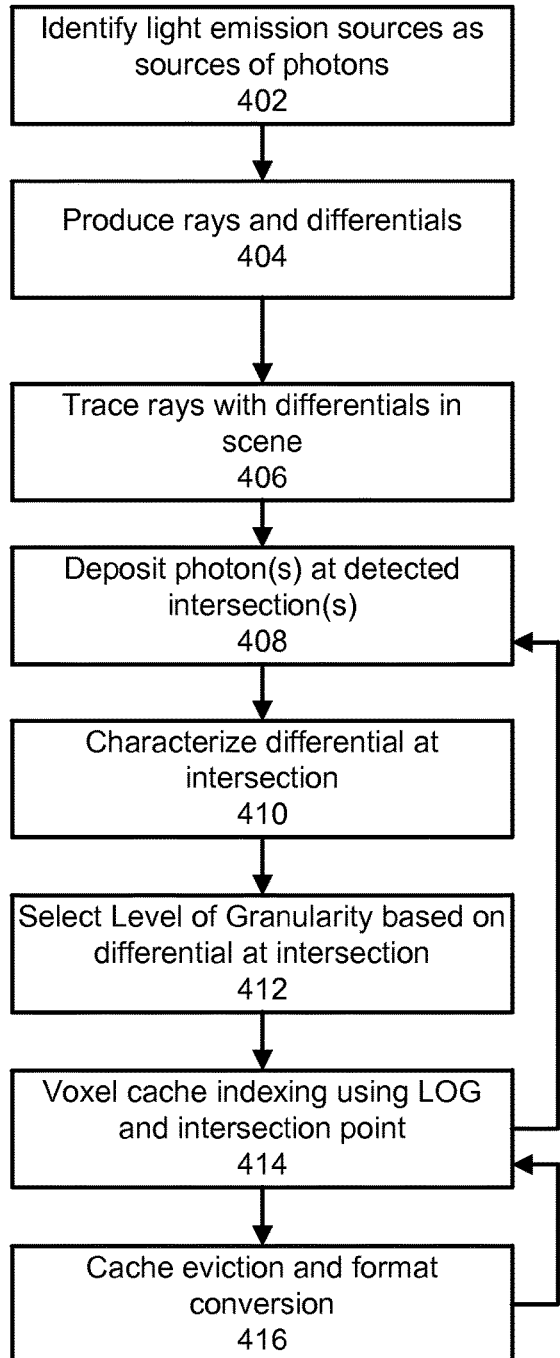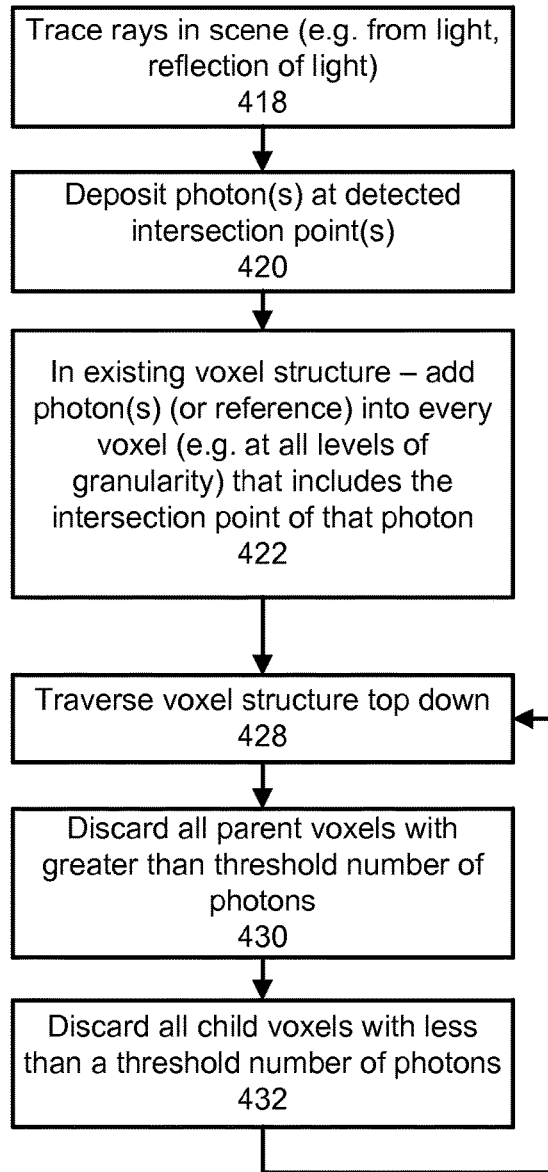
FIG. 17    FIG. 18

SYSTEMS AND METHODS FOR 3-D SCENE ACCELERATION STRUCTURE CREATION AND UPDATING

CROSS REFERENCE TO RELATED APPLICATIONS

This application is a continuation of U.S. application Ser. No. 13/567,033, entitled "SYSTEMS AND METHODS FOR 3-D SCENE ACCELERATION STRUCTURE CREATION AND UPDATING" and filed on Aug. 4, 2012, which claims priority from U.S. Prov. App. No. 61/515,801, entitled "Systems and methods of Acceleration Structure Creation", filed on Aug. 5, 2011, both of which are incorporated by reference in their entireties, for all purposes, herein.

BACKGROUND

Field

One aspect of the subject matter relates to creation of scene acceleration structure for a 3-D scene to be rendered, and in a more particular aspect to creating or updating such an acceleration structure for use in rendering 2-D images from a 3-D scene description using ray tracing.

Related Art

Rendering photo-realistic 2-D images from 3-D scene descriptions with ray tracing is known in the computer graphics arts. Ray tracing usually involves obtaining a scene description composed of geometric shapes, which describe surfaces of structures in the scene. These geometric shapes are often called primitives, if they are the shapes that are a type of shape that is capable of being processed by the rendering system to be used; otherwise, the geometric shapes typically are processed in order to produce primitives based on the geometric shapes. For example, patches may be processed to produce triangular primitives.

The primitives can be associated with textures and other information that instructs a computer how light hitting that primitive should be affected by qualities of the primitive. Ray tracing can faithfully render complicated lighting, light transmission, reflection, refractions, and so on, because ray tracing can model the physical behavior of light interacting with elements of a scene.

A common operation in ray-tracing is to determine intersections between a ray and one or more primitives in the scene. An example of a primitive used in defining objects for ray tracing systems is a triangle composed of a collection of vertices located within a 3-D scene space; this description proceeds with this familiar example, but the use of triangular primitives is for clarity, and not by way of limitation.

A definition of a ray may consist of an origin, and a direction and a current clipping distance along the ray, which can be identified as the "t" for the ray. The current clipping distance identifies a current closest intersection detected for the ray, or in the absence of a detected intersection, that the ray has been tested for intersection for distances beyond that distance, and no intersection was found. When a ray completes intersection testing, a closest detected intersection can be returned, and information determined for that intersection, such as an identification of a primitive intersected by the ray.

Naively, these results can be determined for a given ray by iteratively testing every one of the triangles in the scene in order to identify the closest intersected triangle. While such a naive approach works acceptably for scenes with trivial numbers of triangles, this approach is intractable for complex scenes and for commercial products, where many millions, or even tens or hundreds of millions of rays may need to be tested for intersection with millions of triangles, for each frame to be rendered.

In order to accelerate such intersection testing, 3-D spatial acceleration structures are used. Such acceleration structures generally work by subdividing 3D space into different regions, where the regions can each bound a plurality of primitives. Then, each of the regions can be first tested for intersection, in order to determine whether the primitives in that region need to be tested individually or not. In some cases, acceleration structures can be hierarchical, such that multiple tests of different regions within the acceleration structure are performed in order to identify a relatively small set of primitives to be tested for intersection with a given ray.

For a properly assembled acceleration structure, a total number of ray intersection tests should be substantially less than having performed a ray-triangle test between every ray and every triangle in the scene.

SUMMARY

This summary describes an overview of a system and method in which various, more specific aspects can be practiced or implemented. Some of these specific aspects are then introduced.

In one aspect, a method and apparatus for producing an acceleration structure for a stream of primitives is disclosed. The primitives are located in a 3-D scene. The acceleration structure can be of a selected type, such as a bounding volume hierarchy, or a kD-tree. A bounding volume hierarchy can use shapes of a selected type, such as a sphere or an axis aligned bounding box.

In order to produce the acceleration structure, a hierarchical spatial subdivision is formed for the 3-D scene and comprises sets of elements at different levels of granularity. Each streamed primitive is categorized to select a level of granularity at which the primitive is to be bounded by sets of elements from the selected level of granularity. As a particular example, a larger number of smaller spatial subdivisions can be used to collectively bound a given primitive, or a smaller number of larger spatial subdivisions can be used. The larger number of smaller spatial subdivisions are in a more granular layer of the hierarchical spatial subdivision.

For the selected level of granularity, one or more elements of the hierarchical spatial subdivision are identified, which collectively bound the primitive. A primitive ID is added to a cache entry for each identified element of the hierarchical spatial subdivision. Further primitives can be similarly processed, such that multiple primitives can be collected into a given element of the hierarchical spatial subdivision.

Within each element of the hierarchical spatial subdivision, coverage of the primitives collected in that element is tracked. In one example, coverage is tracked by determining a sub-volume, within the element that bounds the primitives (or parts of primitives) with that element. In such an aspect, coverage can be viewed as a union of volumes, for a given shape of bounding volume (such as a cube, or sphere).

Eventually, a cache entry for a given element of the hierarchical spatial subdivision can be evicted from the cache. The coverage for that element is used to form define or select an element of the acceleration structure that will be used for ray intersection testing. The coverage for that element also is aggregated, with coverages of other elements of the hierarchical spatial subdivision into a larger element of the hierarchical spatial subdivision. One or more primitives can be directly associated with the larger element (and other elements at the level of granularity), and coverage can be maintained as the union of all these elements. This information also is cached (identifying the bounded elements and/or primitives) and ultimately used to define another element of the acceleration structure, and potentially be aggregated into a still-larger element of the hierarchical spatial subdivision, and so on, until one or more root nodes for the acceleration structure have been determined.

In one specific aspect, systems and methods according to the disclosure agglomerate primitives and bounding box elements in order to form an acceleration structure. Elements of the acceleration structure are determined using a working spatial subdivision hierarchy in which elements are readily addressable or identifiable. In one example, elements can be uniquely addressed using a 3-D location and level of granularity; in other words, each 3-D spatial location is contained by exactly one element of the subdivision hierarchy at each of a plurality of levels of granularity. A type of acceleration structure (shapes and/or interrelationship of elements) built can be decoupled from how the working spatial subdivision hierarchy is represented.

In another aspect a method for producing an acceleration structure for use in 3-D rendering comprises characterizing each primitive of a stream of primitives according to a heuristic comprising one or more of alignment to a one or more axes of a 3-D coordinate system, an absolute size of the primitive, and an aspect ratio of the primitive. The method provides for determining a set of elements of a working subdivision structure for a 3-D scene in which the primitive is located. The set of elements can be of the same form and/or size, selected from a plurality of forms, and each form having a plurality of sized subdivision elements. Different primitives of the stream of primitives can be bounded by elements of different forms and sizes. Each element also can have a parts (or the entirety of) multiple primitives within a volume defined by that element. Leaf nodes of an acceleration structure are formed based on the elements of the working subdivision structure. Each leaf node comprises a respective bounding volume that bounds the primitive or primitives in the element of the working subdivision structure for that leaf node. The method also includes recursively agglomerating bounding volumes to produce increasingly larger bounding volumes. At each recursive agglomeration, an element of the acceleration structure includes a bounding volume that is a union of each bounding volume agglomerated into that element.

Another aspect relates to photon mapping and forming acceleration structures for use in querying mapped photons. In an example, a method comprises forward tracing a ray from a light source in a 3-D scene to identify a respective location in 3-D space at which one or more photons are to be deposited. A level of granularity, within a voxel hierarchy, at which to store each photon is selected. The level of granularity is selected based on an indication of effective radius of the photon, and a distance from the light source. In an example, a ray differential is used to represent the effective radius; hardware or software performing the photon emission also can provide metadata concerning such effective radius. Each photon is located within a voxel of a level of granularity selected based on the effective radius, and which includes the identified location in 3-D space for that photon. Data is cached for the photon with respect to the voxel. Responsive to an indication to evict a cache location, photon data associated with that location is written out and used to produce an element of an acceleration structure representing the photon data written out. In this situation, during processing of a stream of photons, photons can be blended or otherwise combined into a distribution, function or parameterized representation. Other approaches to photon mapping include mapping all photons to every level in the hierarchy and then selectively pruning nodes in the hierarchy to produce nodes that have balanced numbers of photons, and/or to produce an acceleration structure that represents photons at an appropriate degree of precision. In some examples, photon data is blended for larger nodes in an acceleration structure and collected against faces of the nodes, or at a center of a node, for example.

Other aspects to note are that systems practicing disclosed aspects can maintain high bandwidth links that stream data to and from external memory, while a relatively small memory formed integral with a processing element provides space for caching, as described above. Thus, primitives and acceleration structure data are streamed, and a large amount of acceleration structure state is not maintained in an external memory. In general, systems built according to the disclosure can produce acceleration structures in worst case build times of 0(n log n), where n represents a number of primitives processed. In some implementations, primitives can be processed with minimal floating point computation, which allows relatively small fixed function hardware implementations and so can be implemented cost effectively in hardware. Systems and methods can be tuned to form a particular kind of acceleration structure.

BRIEF DESCRIPTION OF THE DRAWINGS

The attached figures represent the concepts of primitives and other volume elements that are defined in 3-D space as 2-D shapes, for clarity. However, these elements are still referred to and treated as elements defined in 3-D space. Those of ordinary skill would understand, from these disclosures, how to implement these techniques in 3-D rendering.

FIG. 4A-F depicts various aspects of example of multi-level subdivisions of a 3-D scene, for use in methods and systems according to the disclosure;

FIG. 5 depicts an example toy set of primitives for which an acceleration structure is to be created;

FIG. 13 depicts aspects of operation of a cache according to the disclosure;

FIG. 17 depicts a process for determining an acceleration hierarchy for photons;

FIG. 18 depicts another process for determining an acceleration hierarchy for photons.

DETAILED DESCRIPTION

Figure 1:
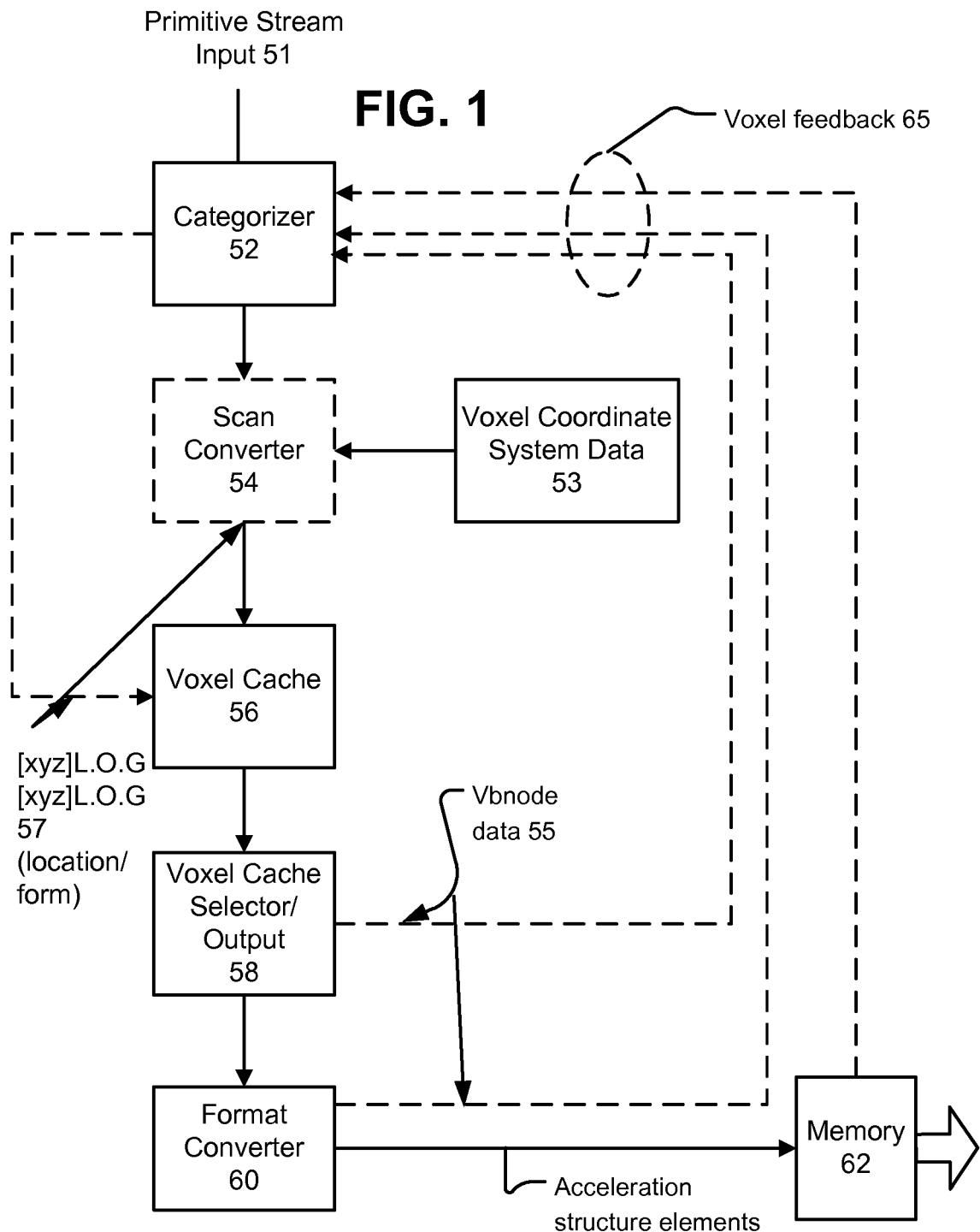
FIG. 1 depicts an overview of an example system in which aspects of the disclosure may be implemented.

The following information relates an example of an algorithm to generate an acceleration structure which includes elements that bound surfaces in a 3-D scene. In a specific example, the surfaces are defined by primitives, and the acceleration structure is used for ray tracing. In another example, the acceleration structure can be created for use in photon querying.

Acceleration structures can be created according to a variety of approaches. Although acceleration structures are supposed to accelerate the testing of rays for intersection, and do accomplish that goal, the usage of acceleration structures creates other overhead within an overall rendering system. For example, there is an overhead to build the acceleration structure for a given scene.

Some acceleration structures may be designed for a static 3-D scene (i.e., one that is not animated), and instead, a view point, and lights in the scene may be variably positioned. In such cases, a relatively careful and time consuming build of an acceleration structure can be justified. If such a static scene were to be used unchanged over a long period of time (e.g., a model of a building to be built that is being viewed from a viewpoint), then a time required to construct the acceleration structure may be neglected in the overall judgment of the quality of the acceleration structure for such purpose.

However, in a dynamic scene, objects may enter, leave, or move within the scene, change their geometry, and so on. In these kinds of applications, an amount of overhead to build or update the acceleration structure can become a substantial portion of the computation required to render images from the scene. For these more frequently updated scenes, such as in an animated scene, or where real-time changes may be made to the scene, a (re)build time (and an amount of compute resources required to achieve such build time) of an acceleration structure can be an factor in judging the usability of a given approach to building acceleration structures. Thus, for a dynamic application, approaches to building and using acceleration structures should factor both the time and resources required to build (or rebuild/modify) an acceleration structure, as well as how much the acceleration structure helps accelerate the actual ray tracing of the scene.

This situation also accounts for the general fact that for a given approach to building an acceleration structure, expending more computation resources to build a given acceleration structure results in a "better" acceleration structure, in the sense that comparatively fewer intersection tests would be needed for each ray. In the context of ray tracing, a goal for use of an acceleration structure is to get closer to a constant resolution time for ray intersection tests, as a scene grows more complicated.

Approaches for acceleration structure creation can be judged based on a time required to assemble the structure for a given triangle count as well as an average time taken to resolve each ray intersection (called a "traversal time" herein). Example units of measure can be "triangles per second" and "rays per second" respectively (which can be analyzed for a specific architecture or a fixed and specific set of compute resources). It can be useful to further express these factors as "node tests per ray" and "triangle tests per ray", which can increase independence of the metrics from particular compute resources.

The generality of a given acceleration structure building algorithm can also be of interest. For example, some kinds of acceleration structure building algorithms may perform better than others for some kinds of 3-D scenes. Additionally, some kinds of algorithms may produce a better acceleration structure if using a particular kind of shape or procedure in the acceleration structure. For example, "long-skinny" and/or off axis geometry can be poorly bounded (e.g., too loosely) in many typical bounding volumes used for acceleration structures. Shapes that are insensitive to this characteristic are more costly to intersect with a ray during traversal and difficult to produce during acceleration structure assembly.

If a given acceleration structure building approach is desired to be used in varied, and often unknown scene building conditions, then it may be desirable to gather such metrics for a variety of sample scenes that can have different kinds of characteristics which may challenge the acceleration structure building algorithm in different ways. More specifically, some acceleration structure approaches may have favorable traversal times, but at the cost of slow build times (on the order of many seconds or minutes), unrealistic computation requirements for commercially viable implementations, or both. Scene specific effects also can be made apparent.

In one aspect, the present disclosure relates to acceleration structure building approaches that are useful in dynamic scenes, such as in animation, or other situations where the 3-D scene may need to be updated many times per second, but with computation requirements that are realistic and balanced (however, use with dynamic scenes is not a requirement). In some aspects, the present disclosure relates to approaches that can be scaled based on a target available computation resource, or a given performance target, or both. Thus, in some aspects, the present disclosure relates to approaches for arriving at a balanced system, with consideration of acceleration structure build time and ray traversal time.

Example characteristics of an acceleration structure building algorithm according to this disclosure may include any of the following: a streaming pipeline avoiding recursion, O(n log n) worst case build time, where n=triangle count. Simple and efficient method to determine spatial adjacency in the bottom-up build. Triangles are processed using a method similar to voxelisation/3D scan conversion using simple integer arithmetic and avoiding/reducing floating point computation. Intermediate data transfer/bandwidth usage can be constrained to stay within a specified amount of on-chip local memory. A trade off between quality of resulting acceleration structure and available local memory storage can be determined. Off-chip data transfer/bandwidth usage can be streamed, such as streaming reads of geometry and streaming writes of acceleration structure definition data.

The disclosure provides for algorithm that may place multiple bounding volumes across long-skinny geometry to tighten bounding of the geometry to reduce wasted ray-node tests. A Kd-tree provides an example of a regular structure and a Bounding Volume Hierarchy (BVH) is a category of acceleration structures that may be irregular. Acceleration structures also may be homogeneous (where a given element directly bounds only other elements, or primitives, and leaf nodes directly bound all primitives) or inhomogeneous, where any given element can directly bound a combination of other elements and primitives.

In the following disclosure, a vertex can be considered to define a point in 3-D space, and can be represented by a tuple of values. A triangular primitive can be defined by 3 vertices. In a mesh of triangles, vertices can be shared among different primitives, rather than defining each primitive by a distinct set of 3 values. A mesh can also include a rule of interpretation, such as a winding order. For example, a triangle strip mesh defines triangles using one additional vertex, in conjunction with two previous vertices of a previous triangle. Thus, for n vertices, n−2 triangles are described. A "triangles" mesh uses 3 individual vertices to define a triangle. As such, for n vertices, n/3 triangles are described (n divisible by 3). A variety of other representations of triangular primitives can be implemented. Also, in various implementations, primitives are not necessarily triangular and can be formed of other kinds of surfaces. As such, the example of triangular primitives is not by way of limitation, but rather used for setting forth various aspects of the disclosure clearly and succinctly.

Systems and methods can process meshes of primitives, such as triangle strips, and can input or otherwise access vertex connectivity rules for a mesh to be processed. A mesh can be identified using an identifier; a pointer can reference an array of vertex data that defines the triangle mesh. Information such as total triangle count.

This disclosure primarily relates an example in which a fixed 3-D scene subdivision (e.g., a voxel grid) is used as a working scene subdivision, in order to map a stream of primitives to portions of a 3-D space. After a set of primitives are mapped to a portion of 3-D space, one or more elements of an acceleration structure that are to be used during rendering are created from that mapping. Thus, in the present disclosure, a final acceleration structure can be produced that has different elements than the scene subdivision used for mapping the primitives to 3-D space. However, the final acceleration structure is not by necessity different in character from the 3-D scene subdivision used for mapping.

In an example, geometry is specified as to locations in a 3-D scene, such as using 3-D world space coordinates, often referenced from a (0,0,0) position. So, all the geometry will be located somewhere in a 3-D space, collectively defining an extent of the geometry in all of the scene dimensions. A 3-D scene subdivision can be matched to the space occupied by the geometry (e.g., the locations of the top level parts of the scene subdivision can be aligned to the geometry). However, in one approach here, a full extent of a 3-D scene subdivision is rounded up to a next higher power of 2 in size. Then, all scene subdivisions are sized and placed according to powers of 2, and are indexed using integers.

In an example, the 3-D scene subdivision is a multilevel set of axis-aligned cubic volumes, each referred to as a voxel herein for brevity. A voxel can be analogized to a pixel, in 3-D. Multilevel includes that any given point in the 3-D scene is bounded (enclosed) by several voxels of different sizes—where voxels of different sizes are in different levels of the multilevel set. Each level in the hierarchy is identified by a Level of Granularity (LOG) herein, evoking that there is a progression from larger to smaller cubes within the multilevel set. For example, an entirety of the 3-D scene can be identified as LOG=0, and which can contain a single cube. In an example, a number of cubes in a given LOG can be found as $(LOG+1)^3$, making a progression of 1, 8, 27, 64, and so on. Collectively, the voxels at each LOG cover the 3-D scene. In an example, there are 32 levels of granularity, which would allow for 32,768 voxels at LOG=31. Stated otherwise, the 3-D scene subdivision to which primitives are mapped can represent space as a set of 3D grids of discreet voxels at various resolutions within a 3-D scene.

As will be explained in detail, each voxel at a given LOG can be individually addressed using a 3-D integer coordinate [xi,yi,zi]. In order to fully specify any voxel in the multilevel set, a LOG for that voxel also must be specified. Specifying a 3-D integer coordinate specifies a set of voxels for all LOGs having that specified integer coordinate. Therefore, the disclosure provides that a 3-D scene subdivision allows for readily addressing or uniquely identifying any member of the 3-D scene subdivision. Voxels are an example approach, and not by way of exclusion. More generally, any kind of approach that allows addressing a subdivided portion of a 3-D space with a neighborhood that varies from small to large can be used. More generally still, any approach that allows addressing sub-divided portions of 3-D space that specifies one or more of a form of the sub-divided portion, an orientation of the sub-divided portion with respect to scene coordinate axes, and a relative size of the sub-divided portion can be used. For example, a point in 3-D space and a set of offsets can be used to describe a set of bounding volumes, rather than an explicit integer coordinate set for each voxel, as exemplified above. In view of the above, a variety of details and examples are introduced below, with respect to the figures.

FIG. 1 depicts an example system 50. System 50 has a categorizer 52 that inputs a stream of primitives 51. Categorizer 52 produces a voxel coordinate [XYZ] and a LOG for each primitive processed ([XYZ] LOG 59, as an example). Categorizer 52 is coupled to output to a scan converter 54, which has access to data 53 representing a voxel coordinate system. Scan converter 54 outputs to a voxel cache 56. Scan converter 54 can operate as a digital differential analyzer to step along edges of a primitive and determine whether each pixel encountered is within the primitive. In some implementations, scan converter 54 can operate using integers to define boundaries of the subdivision elements; in some implementations all subdivision elements are aligned to integer boundaries by increasing a size of the space in which the bounding elements are placed to allow alignment described. By contrast with a traditional scan conversion algorithm, which can require that the edge of at least cross through a center of the polygon, scan conversion here tracks any portions of voxels that fall within the primitive. Scan conversion may be beneficially implemented in fixed function hardware. A variety of approaches can be implemented to provide scan conversion for use in implementations of the disclosure. More generally, implementations can provide an approach that produces a description of a set of one or more 3-D shapes that completely contain the primitive, and which each can be separately addressed, such as to establish a cache entry, described below, for each such shape.

Voxel cache 56 outputs cache entries to through voxel cache selector/output 58. Voxel cache selector/output 58 can recycle data from an evicted cache entry (called Vbnode data 55, as explained below). Such data also goes to a format converter 60, which produces acceleration structure elements that are stored in memory 62. Vbnode data 55 can also be stored in memory 62. Format converter can recycle Vbnode data 55, if Voxel cache selector 58 does not. Example operation and usage of these components is disclosed in more detail below.

A Vbnode defines a temporary data structure that represents an element of the spatial subdivision to which the primitives are being mapped. Each Vbnode thus represents a 3D volume of space. Each Vbnode can contain data indicating relationships to other Vbnodes. For example, a Vbnode can have two link pointers, respectively to a sibling Vbnode and to either a first child Vbnode or a vertex. Vbnodes are transient, in the sense that they do not describe a finalized element in a final hierarchy. Rather, they are created during mapping primitives to the working spatial subdivision, passed to the copy-out stage for conversion into finalized elements of the acceleration structure and then are no longer needed. In some implementations, Vbnodes are managed so that they will remain entirely within a local store memory regardless of how large the overall scene hierarchy ends up being. In an example, Vbnodes are intended to be as small as reasonably possible so as to allow a sufficient number of them to be active during hierarchy construction in local store. In an implementation, each requires 32 bytes, allowing 2 to be retained per 64 byte cache line.

Example information that can be provided in a Vbnode includes an indication whether the node is a leaf node, a count of references to the node. if the node has zero references, then it need not be maintained. An indication of where the node is with respect to a parent node (e.g., in an oct-tree implementation, a Vbnode can indicate an octant of the parent node). Vbnodes also can carry data through the pipeline so that the data can be made available to downstream functions or functions that occur later in time.

Figure 2:
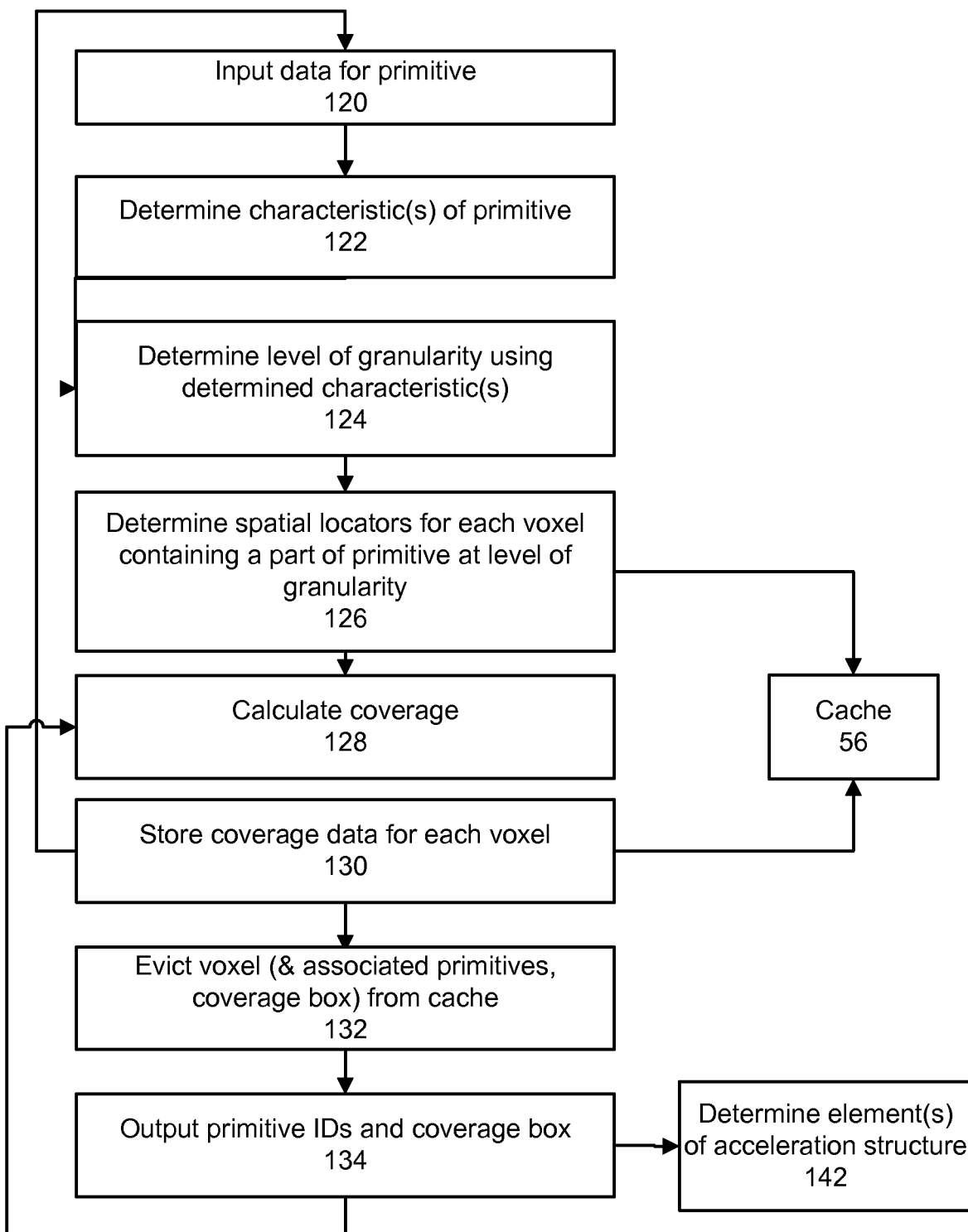
FIG. 2 depicts an example method according to the disclosure.

FIG. 2 depicts an overview of an example method. At 120, primitive data is inputted to categorizer 21. At 122, characteristics of the primitive are determined; at 124, an analysis or use of the determined characteristics is made for selecting a Level of Granularity (LOG) at which the primitive is to be bounded by voxels. In brief, a more granular LOG causes more smaller voxels to be used, while a less granular LOG causes fewer larger voxels to be used. Categorizer 21 can operate according to one or more heuristics that use different kinds of data inputs. Further detail concerning an example approach to primitive categorization is provided with respect to FIG. 3.

At 126, spatial locators for each voxel containing a part of the primitive at the selected LOG are identified; in essence, a set of voxels that contain any part of the primitive are identified. Spatial locators and LOG for each voxel determine a set of entries in cache 56 (see FIG. 13) that will be associated with the primitive.

At 128, and for each voxel determined at 126, a coverage is calculated. In an example, a coverage is represented by a pre-selected shape, having dimensions and a location within that voxel selected so that the coverage is a single contiguous shape that bounds all parts of all primitives within that voxel. In an example, a coverage can be a cubic shape, or an axis aligned bounding box, but which does not require all sides to have equal dimensions. Other examples of coverage shapes include hedrons, and spheres. A shape for representing coverage can be selected based on a kind of shape that will be used in the acceleration structure ultimately produced.

At 130, the coverage calculated at 128 is stored in cache 56. As described above, each of 126, 128, and 130 are performed for each voxel identified as containing a part of the primitive being processed. Thus, after processing a primitive, one or more voxel cache entries may be updated with a link to the processed primitive, and respective coverage(s) associated with each of those voxel cache entries would be updated accordingly.

After 130, a further primitive can be processed. Eventually, a voxel in the cache will be evicted, because, in most implementations, an amount of memory allocated to caching will be less than an amount of memory required to store data for all the primitives of the scene so that elements of the acceleration structure must be created on the fly and are transitory within the system performing the disclosed method.

At 142, an element or elements of the acceleration structure are determined from the evicted cache contents. A larger cache size may allow somewhat better acceleration structure creation, in situations where acceleration structure elements cannot be revised or edited after creation. Such situations arise where geometry and other contents are maintained only transitorily, such that the state required to edit the acceleration structure node may be unavailable. Such also may be avoided for practical considerations, such as causing excessive computation to be performed, for minimal advantage.

Coverage information for contents evicted from the cache is provided to 128, where coverage is calculated for a higher level voxel, based on the provided coverage information, and existing coverage information. In other implementations, coverage information may proceed through steps 120-126 as well.

In practice, primitives can be streamed and when the cache is full, voxels are evicted from cache, so that less granular voxels start to receive coverages from more granular voxels. In a homogeneous implementation, all the primitives are bounded by leaf nodes, so that less granular voxels bound only coverages of leaf nodes, and do not directly bound primitives themselves. In implementations, cache 56 can be flushed or the pipeline otherwise run to complete processing of all primitives before processing coverage boxes. In some implementations cache 56 can have two independently controllable portions respectively allocated to leaf nodes and to non-leaf nodes.

Figure 3:
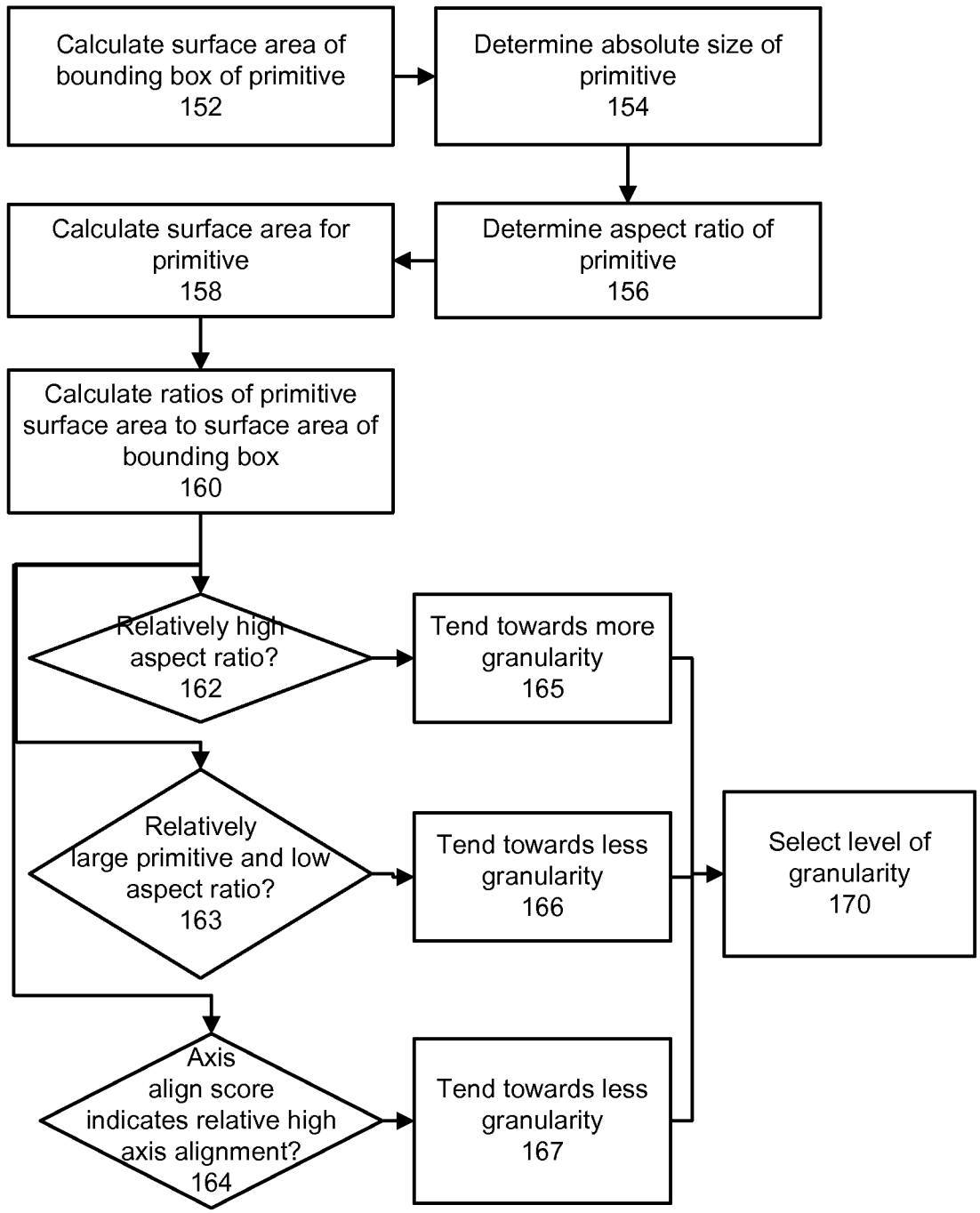
FIG. 3 depicts an example component method that can be used in support of the method depicted in FIG. 2.

FIG. 3 depicts an example approach to categorizing a primitive, in order to select a LOG at which the primitive is to be bound. Examples of how FIG. 2 and FIG. 3 behave with different kinds of primitives is disclosed with respect to FIGS. 4-12.

At 152, a surface area for an axis-aligned box that bounds the primitive being characterized is calculated. At 154, an absolute size of a primitive being categorized can be found, and at 156, an aspect ratio of the primitive can be determined. An aspect ratio of the primitive is a calculation of a length to width ratio; skinny triangles have relatively high aspect ratios. A high aspect ratio is used as an indicator that the primitive may not make proper use of a single large bounding volume, for example.

At 160, a ratio of primitive surface area to the surface area of the bounding box for the primitive is calculated. Such ratio is used as an indication of how well the primitive is aligned with respect to one or more axes of the bounding box (which unless transformed, corresponds to the scene axes). For example, a triangle may run generally vertically, and thus is aligned with a vertical face of a bounding volume, which can then be a smaller thickness, have less surface area, such that the ratio of primitive surface area to that of such a bounding volume would be greater. This calculation is an example approach to determining such a characteristic; other ways may be provided. For all of these determinations or calculations, numbers can be scaled or otherwise changed and they do need to represent any quantity that can be used externally or be available an absolute comparison. For example, for axis alignment ratio, twice the area of the primitive can be used to calculate the ratio, while still maintaining a consistent metric. Similarly, constants can be removed to simplify calculations, where appropriate.

The remainder of FIG. 3 provides an example of evaluating these data in order to arrive at a selection of LOG. As will become apparent, such evaluation need not have firm or hard decisions, but instead can be heuristic. The evaluations depicted in FIG. 3 are shown as being all performed in parallel, but that is an implementation detail. Tuning may be performed by testing different sets of parameters or conditions. At 162, a relatively high aspect ratio results, at 165, in a tendency to more granularity. At 163, a relatively large (absolute size) primitive with a low aspect ratio results, at 166, in a tendency towards less granularity. At 164, an axis alignment score indicating a relatively high axis alignment provides, at 167, a tendency towards less granularity. At 170, based on one or more of these inputs, a selection of a level of granularity is made. As introduced above, the inputs to the selection are generally on a continuum of values, and there can be a fairly large number of levels of granularity (32, in one example).

Further, certain heuristics may be more relevant for some situations than others. For example, the concept of coverage, within a given voxel has been introduced above and will be described below in more detail. If coverage is tracked with an AABB, then axis alignment can be an input that is weighted more highly. If a spherical coverage is tracked, then aspect ratio may be weighted more highly. Automated tuning algorithms can be performed that will search the input space and determine for different acceleration building setups, what selection criteria are suitable; manually tuning can be performed, or a combination thereof. Other inputs can be provided to such a selection process, and these are exemplary. Not all inputs need to be provided in all circumstances.

Figure 4A:
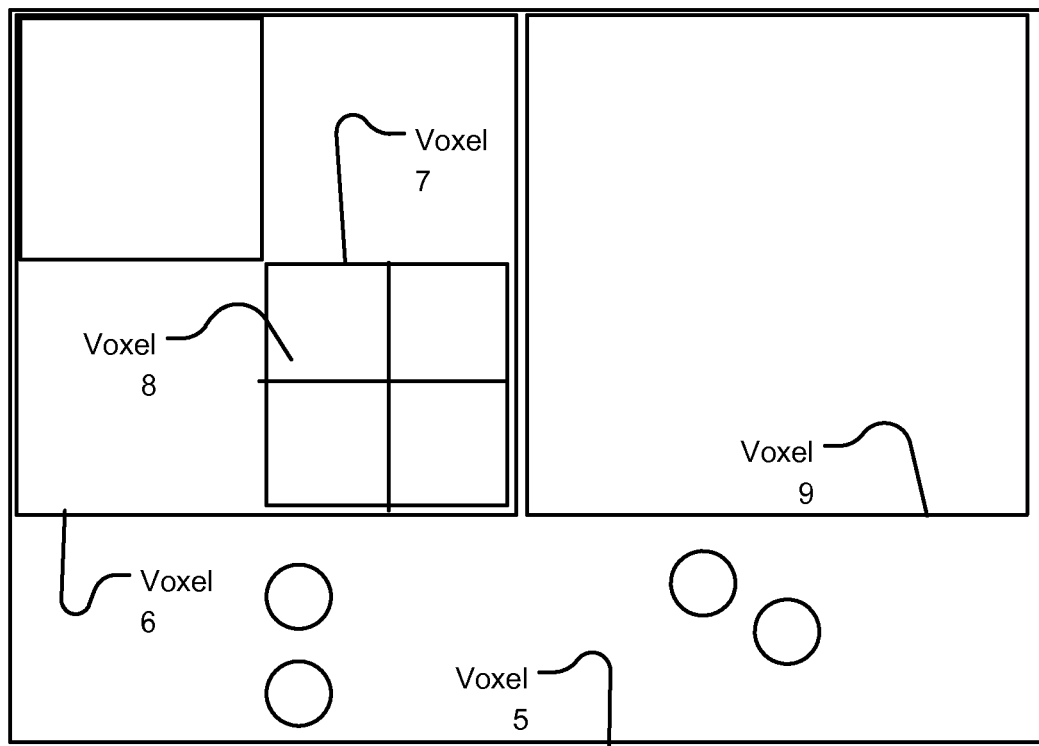

FIGS. 4A-F begin a toy example that applies the disclosures above. FIG. 4A depicts voxels 5-9, provided as a 3-D spatial subdivision for use building an acceleration structure. The example of FIG. 4A shows a situation where voxels have the same form and are nested within each other. Here, the term "form" is used to describe aspects of voxel shape(s) used in the spatial subdivision. For example, a cubic form provides equal length sides in all three dimensions, as shown in 2-D in FIG. 4A, while a rectangular form has an elongate dimension. Form also refers to an aspect ratio of non-cubic shapes, in that a rectangular shape can have surfaces with a low aspect ratio, being more cubic, and/or have a high aspect ratio, more elongate and less cubic. Since in practice, voxels are in 3-D space, some faces of a rectangle can be cubic, while others are highly elongate. Also, because voxels of a given form can be provided at difference sizes (e.g., as a nested voxel structure, like that shown in FIG. 4A), form also can refer to different scaling properties, which indicates how a given voxel scales larger and smaller. In one approach, every dimension of a voxel scales uniformly (e.g., by a power of 2). In another approach, one or two dimensions scale uniformly, and the other dimension may scale differently, or not at all.

The term "form" also can refer to differences in orientation of voxels in 3-D space (e.g. alignment with one plane or another in 3-D coordinate space. As will be shown with respect to FIGS. 4B-F, a variety of other forms can be provided that have different relative sizes for different dimensions, orientation differences, and so on. In sum, FIG. 4A depicts an approach where all voxels have a cubic voxel form. FIGS. 4B-4F depict aspects of voxes of other forms, which can be used alone or collectively in a subdivision. In one particular approach, within any given spatial subdivision, voxels of multiple voxel forms may be provided, and a set of appropriate voxels, from the available voxel forms, can be selected for bounding a particular primitive.

Figure 4B:
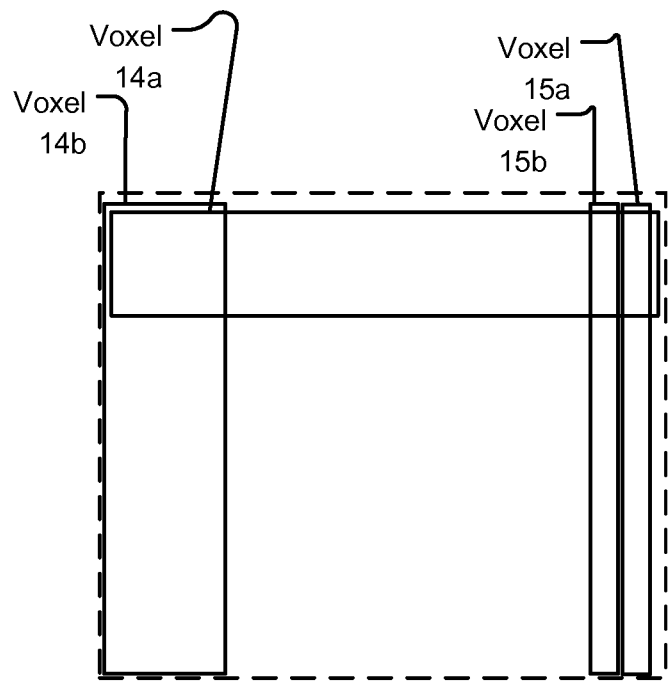

In FIG. 4B, example voxels 14a and 14b are rectangular in cross-section, having non-cubic cross-section in the cross-section plane. In FIG. 4B, depth is not depicted, and a person of ordinary skill would understand from this disclosure that the depth of voxels 14a and 14b is another variable parameter within the form of the voxels. For example, the depth can be roughly equal to the height, less or greater. FIG. 4B also depicts rectangular voxels 15a and 15b, having a form where the aspect ratio in the cross-section plane is higher than voxels 14a and 14b, and depicts also that voxels 15a and 15b would nest (be within) volumes defined by voxels like voxel 14b, in that voxel 14b would be repeated across the space identified by the dashed box, in which voxels 14ab and 15ab are defined. Orientation differences between voxels 14a and 14b show that voxels of a given dimensional form also can have orientation differences. To be clear, in all of these examples, for each voxel form depicted, e.g., voxel 14b, an entirety of the 3-D space being used can be filled with voxels of that form, and again, with voxels of the same form, but smaller. Each voxel form, at multiple different sizes and orientations, can fill the 3-D scene.

Figure 4C:
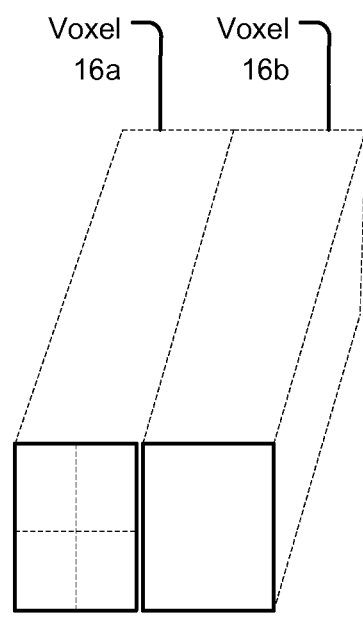

FIG. 4C depicts voxels 16a and 16b that are 3-D elongate voxels, and that dashed lines cross a face of voxel 16a, depicting scaling of voxels of the form 16a and 16b, within the dimensions of the face, but not the depth. FIGS. 4D-F depict voxels 17-19, which have various scales and orientations in 3-D space. In one approach, voxels are axis aligned bounding boxes, consistent with the examples of FIG. 4A-4F.

From the above disclosures, it should be apparent in some embodiments, the 3-D scene is subdivided so that every location (position) in the 3-D scene is within a plurality of voxels, which can have one or more of different forms and/or difference sizes. Each of these voxels can be addressed individually. Addresses can be constructed according to a pre-determined convention. For example, a pre-determined set of forms of voxels can be selected (e.g., cubes, square ended elongate rectangles, thin, large area rectangles, and so on). Each of these forms can be arranged to fill the 3-D scene in more than one orientation, e.g., thin large area rectangles can be stacked parallel to an XY plane, in increasing Z, and in the YZ plane, in increasing X. So, an address includes components to identify a form, identify an orientation of the form, a size of the voxel, and also a position. These disclosures thus show that a complete set of voxels, from which one or more voxels can be selected for bounding a particular primitive, can be comprised of voxels of many different forms, sizes and positions, allowing a better selection of voxels to achieve a better bounding volume. For example, a light pole and a telephone pole may be bounded by a voxel of similar form, but different size, while a wall roughly the same size as the light pole may be bounded by a voxel having a similar height, but an overall different form.

Figure 6:
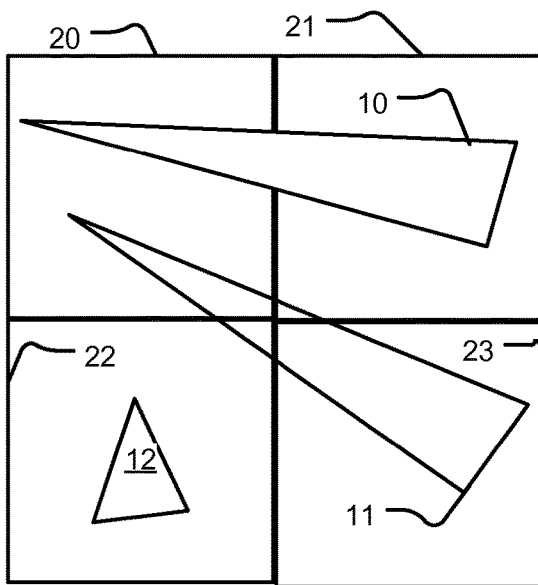
FIG. 6 depicts of some of the primitives mapped to voxels at a selected Level of Granularity (LOG)
Figure 7:
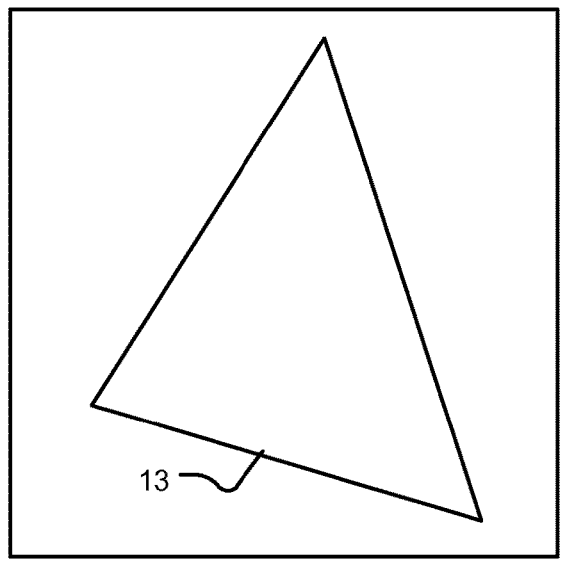
FIG. 7 depicts a relative large and regular primitive mapped to a voxel at a different LOG than the primitives of FIG. 6

FIG. 5 depicts primitives 10-13 located in 3-D space, comprising primitives for which an acceleration structure will be created. FIG. 6 depicts voxels 20-23, at a selected LOG, with primitives 10-12 being overlayed on voxels 20-23. FIG. 7 depicts a voxel 9 at a less granular LOG in which is contained primitive 13. FIGS. 6 and 7 depict that primitives can be wholly contained in a voxel (as in FIG. 7), or can be bounded by a series of voxels. FIG. 6 and FIG. 7 also depict that primitives can have very different shapes, with different aspect ratios and axis alignment. FIG. 6 depicts that primitive 10 is more axially aligned than primitive 11, and that both primitive 10 and 11 have a relatively high aspect ratio compared with primitive 13. In accordance with the heuristics of FIG. 3, primitive 13 can be mapped to a lesser granularity LOG than primitives 10 and 11.

Figure 8:
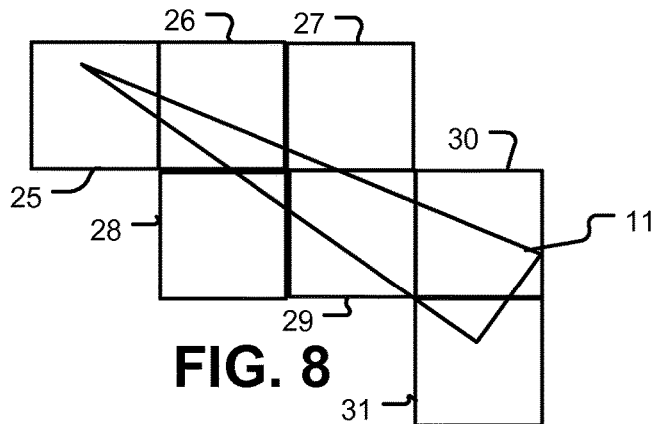
FIG. 8 depicts an example where a primitive appearing in FIG. 6 is mapped to voxels at a more granular LOG than in FIG. 6.

FIG. 8 depicts voxels 25-31 at a yet still more granular LOG, and which collectively bound primitive 11. Primitive 11 is less axis aligned than primitive 10, and therefore, can beneficially use a tighter fitting set of voxels 25-31 from which to produce acceleration structure elements. Of course, depending on circumstances, a yet still more granular LOG may be selected, which would provide still tighter bounding, but at the expense of more voxel elements, which generally is correlated with having more elements in a final acceleration structure, thus giving an example of a tradeoff between avoiding bounding boxes that are too loose for the primitive, but not creating too many acceleration elements that all need to be tested and stored.

Figure 9:
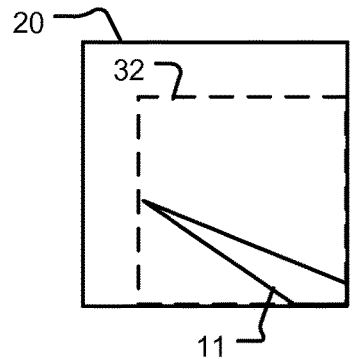
FIG. 9 depicts a cubic coverage volume for a part of a primitive mapped to a particular voxel

FIG. 9 depicts voxel 20, with a part of primitive 11 that is within that voxel. FIG. 9 depicts a coverage 32, which in this example is itself a cube (requiring that all edges are of equal length). For a given voxel, "voxel coverage" or simply, "coverage" defines a portion of a voxel that bounds all geometry at least partially in that voxel (either directly or also bounded by more granular voxels). In an example implementation, an axis aligned bounding box within the voxel can represent the coverage and is defined in proportion to the scale of the voxel. Since the coverage box can be defined within a voxel location, it can be represented with substantially reduced precision. In an example, 8-bits per axis can be used. In another example, a coverage volume is a cube. Other representations can be used, such as a location, and an extent in one or more directions defined relative to the location; in some implementations, coverage can be represented by an arbitrarily complex shape; however, implementations benefit from minimizing an amount of data required to represent a coverage, so that more voxels can be represented in a fixed-size cache simultaneously.

Figure 10:
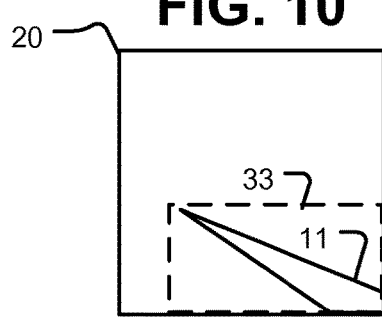
FIG. 10 depicts an axis-aligned coverage volume for the part of the primitive mapped to the voxel of FIG. 9.
Figure 11:
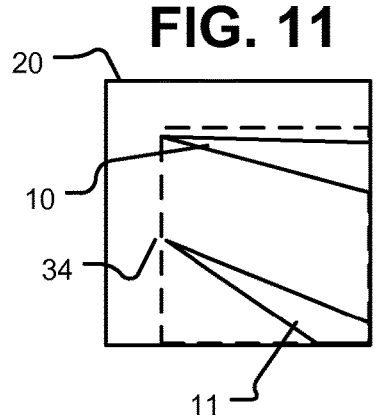
FIG. 11 depicts an example where the axis-aligned coverage volume of FIG. 10 is extended to include another primitive.

FIG. 10 depicts an example in accordance with FIG. 9, where voxel 20 and primitive 11 again are depicted, except that a coverage 33 is tracked with an AABB shape, not a cube. FIG. 11 depicts that coverage is a union of space that comprises all parts of primitives that exist within a voxel; in particular, primitive 11 is now added to voxel 20, and a coverage 34 is generated as a union of the coverage 33, and what is required to bound primitive 10 as well.

Figure 12:
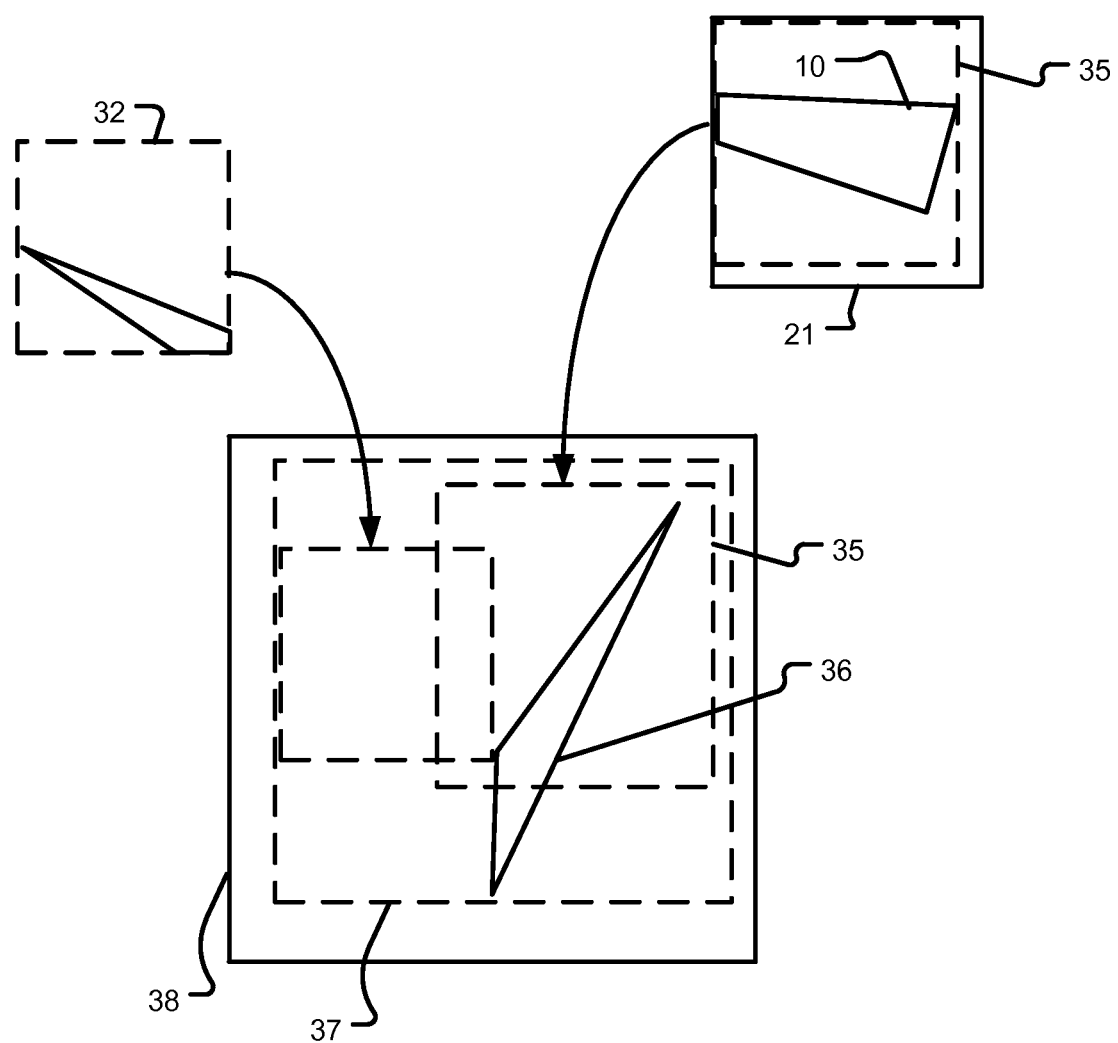
FIG. 12 depicts including coverage volumes from more granular LOGs and a primitive directly in a voxel at a less granular LOG.

FIG. 12 depicts how coverages and primitives can be aggregated into voxels at less granular LOGs. Coverage 32 and voxel 21, with a coverage 35 of primitive 10 also is depicted. Coverage 35 and coverage 32 are added to a voxel 38, as depicted. A primitive 36 also is added directly to voxel 38. A coverage for voxel 38 thus is a union of coverage 35, coverage 32, and primitive 36, under constraints determined by the kind of shape to be used in representing the coverage (e.g., voxel, AABB, sphere, or other shape). In this example, coverage is calculated based on coverages of more granular voxels, and for any primitive (e.g., primitive 36) that is directly bounded by a voxel (e.g., voxel 38). Thus, a coverage for a less granular voxel is not recalculated directly from primitives in this example.

FIG. 13 depicts an example of cache 56 and operation thereof. As described above, cache 56 stores a spatial location ID for each voxel and data indicating a LOG for that voxel. Examples of such are depicted in FIG. 13, as spatial location ID 205, 207, and 209. LOG 206, 208, and 210 are respectively associated with spatial locations 205, 207, and 209. FIG. 13 depicts each spatial location ID also has a coverage maintained, which is indicative of a union of all primitives and parts of primitives within that voxel (directly or indirectly bounded). Additionally, identifiers of every coverage and shape (primitive) that is being cached with respect to that spatial ID is also provided. Such information at least should identify these coverages and/or shapes, but does not need to include definition data for them.

In operation, cache 56 is addressed using a spatial coordinate and LOG (e.g., [X,Y,Z]LOG 218) which is inputted to a cache location mapper 220. This can be both for adding a coverage or a primitive to an existing voxel cache entry, and creating a new voxel cache entry. In the example, mapper 220 hashes (231) [X,Y,Z]LOG 218 to produce a hash value 235 that is used to identify (233) candidate cache locations (Loc 237-239); this aspect is related to an interleaving factor, and if the cache allows any location to store any voxel, then candidate locations need not be identified, and instead, a free location list can be maintained. If the operation is an add voxel (240) operation, then a determination (245) whether there is a free location; if so, the voxel is added there; if not, an existing voxel location is evicted (249) to free a location. For an add to location operation (241), a determination whether there is still space in that location is made (242), if so, then the primitive or coverage is added, and if not, then eviction (249) is performed. Which location to evict can be determined according to a heuristic, such as a usage metric, or a number of elements in that location, or a disparity between a level of granularity of the voxel in that location compared with an average of other locations, or a combination of these, or another heuristic deemed suitable. Information associated with a coverage can include a thread identifier that produced the coverage, an address of the voxel to which the coverage pertains, and a link to a sibling and a child node (if any). Other fields can be provided for passing data through the cache for application-specific purposes.

It should be understood that a variety of transformations can be conducted during performance of methods according to the disclosure (and operation of systems). Not all possible transformations are disclosed, as these are a matter of implementation and a person of ordinary skill would be able to determine whether and when to use a certain transformation when making an implementation, in view of these disclosures. The following provides an example of such transformation.

As introduced in the example above, 3-D scene space is subdivided into a multilevel set of axis-aligned cubic volumes (such as a voxel hierarchy). Input geometry can be described using real numbers in world-space; therefore, all input geometry can be transformed into a coordinate within the voxel grid at a particular LOG (or LOGs). This transform can be a scale and translation into a bounding cube that fully contains all input scene geometry. At a start of hierarchy construction, it can be assumed that a world-space axis aligned bounding cube can be known that contains all such geometry (such as an output from a prior vertex processing pipeline stage within a renderer, coupled to this acceleration structure builder. After transformation, all internal operations can be performed in the local coordinate system. When copy-out occurs, an inverse transform is used to produce respective world-space bounding volumes in the scene hierarchy from representations in transformed 3-D space. In order to perform such inversion, the voxel hierarchy can be associated with data, which can include specific data for each LOG. In an example, such data can include (1) minimum world-space coordinate of the bounding cube for this hierarchy, (2) Extent of the world-space bounding cube for this hierarchy, (3) Per LOG scale information, (4) Scale factor for a scene vertex to a voxel at this LOG, (5) world space size of a voxel at a given LOG, (6) world space size of a voxel coverage unit at this LOG, and (7) maximum addressable voxel at this LOG.

Some implementations may also provide or allow for internal transformations that provide enhanced axial alignment for a defined subset of acceleration structure elements, which typically would be bounding an object. For example, an object in the scene can be bounded by a self-contained sub-tree within an acceleration structure hierarchy. This object and it's sub-tree can be rotated to be axis-aligned with respect to an internally meaningful set of axes, by allowing the scene object to be rotated arbitrary way, which means that the object is no longer defined consistently with respect to the scene axes. During ray tracing or other use of the acceleration hierarchy and/or scene geometry, a ray (origin, direction, and clipping distance(s)) can be transformed when it enters this sub-tree into the internal set of axes, and tested for intersection in that transformed condition, which allows traversal in a more efficient hierarchy. Intersections can be transformed back into scene-space, such as for comparing hit distance, or during shading.

Figure 14:
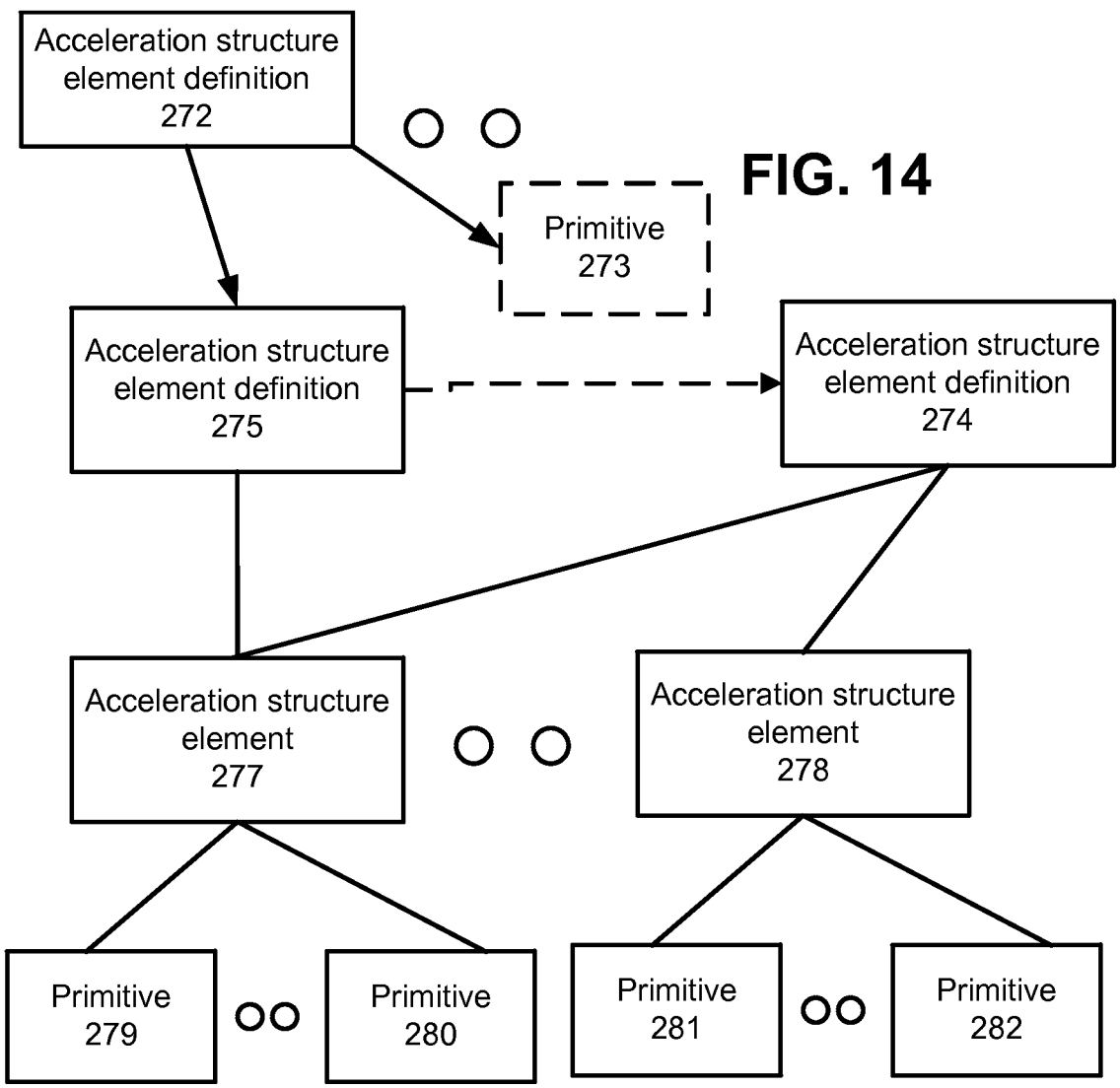
FIG. 14 depicts a logical view of an acceleration structure that can be produced using an implementation of the disclosure.
Figure 15:
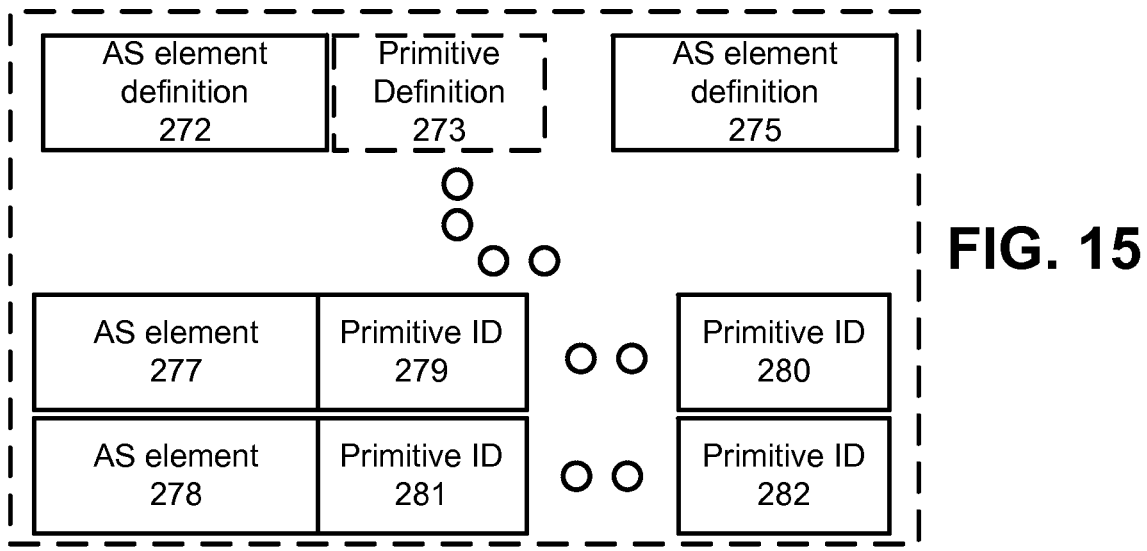
FIG. 15 depicts a packed memory representation of an acceleration structure that can be produced using an implementation of the disclosure.

FIGS. 14 and 15 depict aspects of an acceleration structure derived from the contents of a voxel cache locations that are evicted. FIG. 14 depicts leaf elements 277 and 278, which respectively bound primitives 279-280 and 281-282. These nodes elements are in turn bounded by less granular elements 274 and 275. Element 2725 bounds element 275 and primitive 273. Dashed line between 275 and 274 indicates a sibling relationship. FIG. 15 depicts a packing of elements from FIG. 14, such may be provided for storage in a memory. An acceleration structure can store identifiers or pointers to definition data for primitives, and/or elements of the acceleration structure. However, primitives can require more storage, and may require variable sized storage, given that vertexes may have different amounts of attributes associated with them, and so on.

In one aspect, the above disclosures describe example systems and methods for determining bounding volumes for a set of leaf nodes that bound all of the geometry in a 3-D scene. The leaf nodes can be of different sizes, selected in accordance with one or more characteristics of the primitive and potentially based on a kind of node to be used in the acceleration tructure. Bounding volumes can be recursively agglomerated into larger and larger bounding volumes at increasing levels of abstraction.

Figure 16:
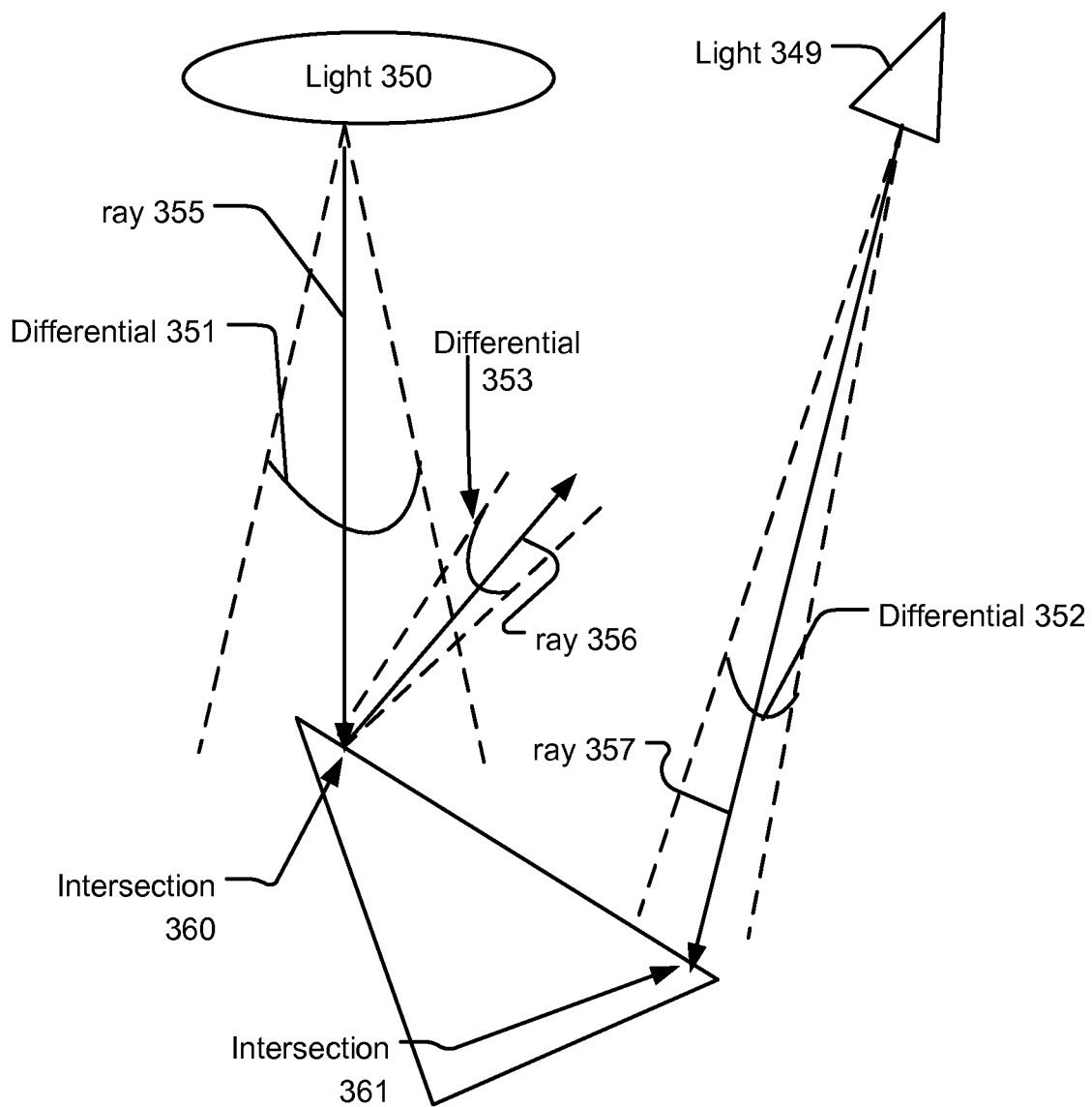
FIG. 16 depicts an example of using ray tracing with ray differentials to deposit photons in a 3-D scene.

FIG. 16 begins an introduction to approaches for building acceleration structures for photon mapping. FIG. 16 shows an example 3-D scene, in which a light 350 and a light 349 emit light into a 3-D space. In photon mapping, photons are first deposited into a scene, by forward tracing light rays from lights. Photons represent a characteristic of light emitted from a location available to be received from a location or volume of space, such that sampling photons from a point during ray tracing can provide illumination information about that point.

In this example, rays forward traced from lights are assigned a differential in accordance with characteristics of the light. For example, a ray 355 is emitted from light 350 and is assigned a differential 351. A ray 357 is emitted from light 349 and is assigned a differential 352. Ray 355 is found to intersect a shape at intersection point 360, while ray 357 is found to intersect at intersection point 361. For simplicity, a single shape is depicted, but in an actual scene, intersections are often widely divergent, and many rays would be cast from each light. FIG. 16 also depicts a reflection ray 356 that also is assigned a differential 353. Such reflection ray 356 also can be used to determine characteristics of a photon deposition.

As will be described, ray differentials can used to determine or otherwise track how a photon should be represented in an acceleration structure. FIG. 17 provides an example of bottom-up photon acceleration structure building. At 402, light sources are identified as sources of photons (scene light sources are identified), and in order to determine photons for each light, at 404, rays and differentials are produced. A differential for each ray can be determined by characteristics of the light source. For example, a focused light source would receive a smaller differential than a diffused light source.

At 406, the produced rays are traced to identify intersections (here tracing includes tracing secondary rays that model reflection, refraction, and so on). At 408, photons are deposited at locations in the 3-D scene for the detected intersections. At 410, a differential for each ray (now linked to specific photons) is used to select a level of granularity of a voxel that will directly store the photon. As in the previous discussion, there are multiple nested voxels that each can bound a particular location in 3-D space. Ray differentials and a distance to the intersection of the ray can be used to determine a width of the ray around an intersection. So, for example a wide differential that intersects at some distance away provides a broad ray at an intersection, while a ray that has a narrower differential at the same intersection distance will be narrower. Having a broader ray at an intersection drives towards usage of a voxel at a less granular level (larger voxel), and conversely a smaller ray at an intersection drives towards a more granular level (smaller voxel). A smaller voxel allows the photon to be located with more precision than a larger voxel, but that precision is unnecessary if the ray is wide anyway. Thus, at 412, a LOG for each photon is selected, and at 414, each photon is associated with a cache location for the voxel determined by the selected LOG and the location of the intersection. At 416, cache eviction can be managed as described above. Format conversion also can proceed similarly, in that a shape that is used in the acceleration structure may be other than a voxel; shapes described above can used. In some implementations, rays can be emitted with a hint or other metadata to be used in selecting a LOG for photons deposited as a result of intersecting that ray. Such metadata can be viewed as a radius of a effect for a non-directional photon specification.

Photon deposition can include associating light color and intensity with a point or distribution of points, or parameters that can be used to determine a light color and/or intensity by interpreting or using the parameters in a calculation. Photon deposition can be done by directly specifying photons to be located in a 3-D scene, and hinting or other meta can be used to select a LOG for voxels to contain the photons.

In another aspect, photons that are within a given voxel can be blended together (color blending), and their locations all represented by a single point in the voxel, such as a center. Contributions of photons also can be merged into a distribution, such as a Gaussian lobe distribution for each face of a voxel. In essence, by blending the photons together, and not attempting to differentiate 3-D positions of each photon within each voxel, storage space can be saved. Such savings comes as a tradeoff with respect to accuracy, but implementations can be adjusted so that an appropriate balance of these factors is achieved. Such blending or merging can be accomplished in conjunction with determining to add a given photon to a specific voxel. A sparse hierarchy of voxels can be created which contains the voxels that have photons and can be used for photon queries.

FIG. 18 depicts a process that implements a different approach to pohton mapping. FIG. 17 depicted that photons were processed in a bottom-up fashion, where larger and larger volumes that abstract larger regions of 3-D space are created in multiple passes. FIG. 18 depicts a different approach. In particular, at 418, rays are traced, and at 420 photons deposited at intersection points. At 422, for a defined full voxel structure, photons are added into each voxel at all levels of granularity (e.g., for a 32 level voxel hierarchy, the same photon is added to the voxel hierarchy 32 times, with the same spatial coordinate, but different LOGs). Thus, a voxel structure that contains all photons at all levels of granularity is produced. After such production, at 428, that voxel structure is traversed top down in a series of passes.

At 430, when a voxel is encountered (a "current voxel") at a given LOG, a count of photons present in that voxel is accessed or produced. If that count is greater than a threshold, then the current voxel is removed from the hierarchy, and the child nodes of the current (now removed) voxel are connected directly to the parent of the removed voxel. At 432, for each child of the current voxel, and if the current voxel is not removed (because it had fewer than a threshold number of photons), then each child voxel of the current voxel is examined. For each child voxel that has fewer (or equal to) the threshold number of voxels, that child voxel is removed. Stated otherwise, when a child voxel has less than or equal to a threshold number of photons, then the photons of that voxel can be pushed into a voxel with a lower level of granularity (larger voxel). Stated differently, FIG. 18 depicts an approach to pruning a complete voxel hierarchy according to a number of photons deposited into different parts of the hierarchy. In one sense, such pruning is directed to maintaining a balance between a number of acceleration elements and a number of photons in different voxels. The approach allows precision to be maintained by using smaller voxels where beneficial (e.g., where they have a comparatively high number of photons). For example, a lens may concentrate light and that point of concentration would have a heavy photon density. Therefore, a small voxel would naturally be maintained for those photons, as a result of performing an implementation of the depicted process.

Figure 19:
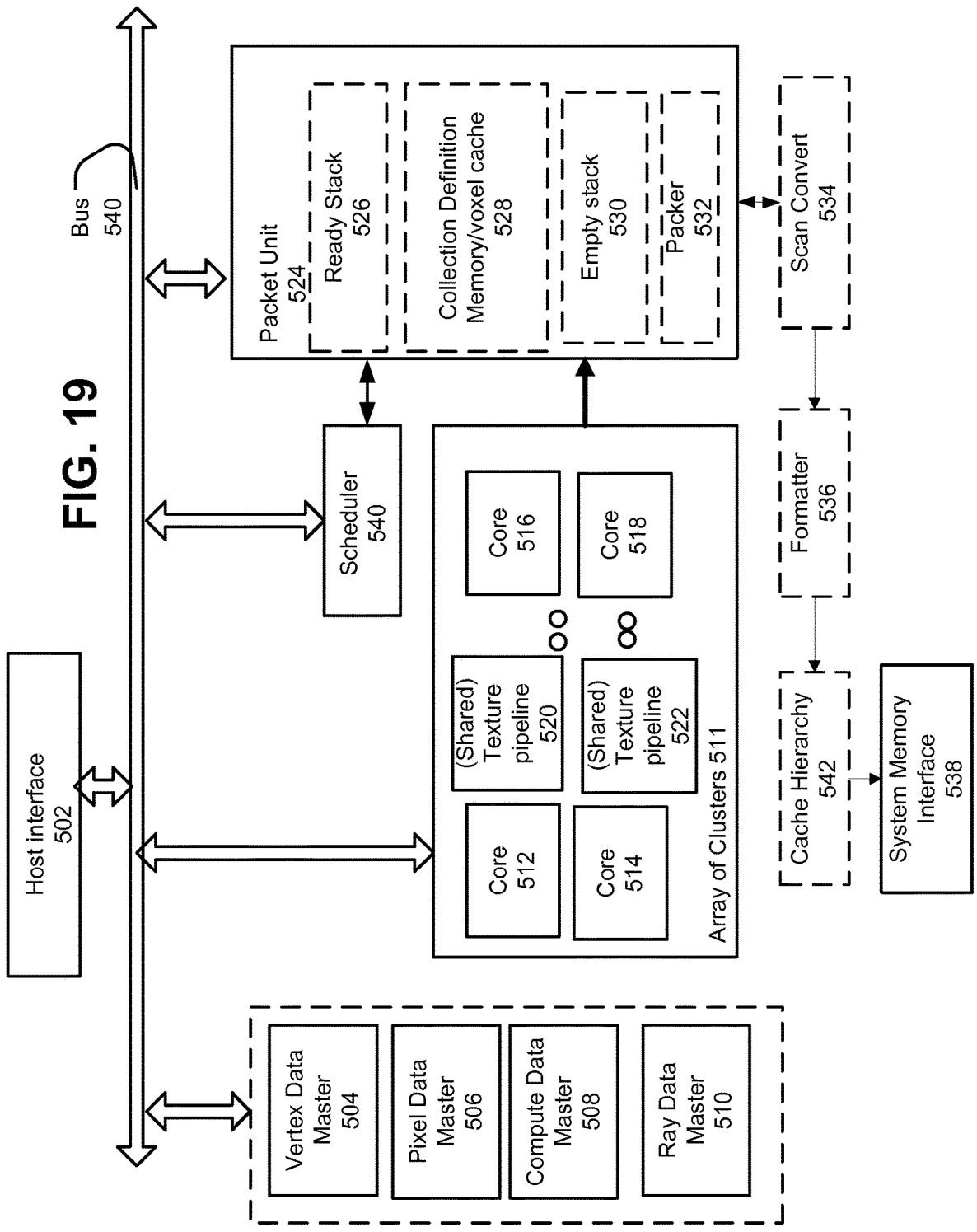
FIG. 19 depicts an example system in which implementations of the disclosure can be provided.

FIG. 19 depicts aspects of an example system in which implementations of these disclosures can be practiced. FIG. 19 depicts an array of clusters 511 which comprises cores 512-518, which can perform computation, such as graphics computation. A set of data masters 504-510 can setup computation to be performed on the array of clusters 511. Array of clusters 511 can have texture pipelines 520 and 522 that are used by one or more cores 512-518. Some kinds of compute can use a packet unit 524 that has a ready stack 526, a collection definition/voxel cache 528, an empty stack 530, and a packer 532. A scan converter 534 can be coupled to packet unit 524, and to a formatter 536. Formatter 536 in turn can communicate with a cache hierarchy 542, which communicates with a system memory interface 538. A host interface 502 can provide communication capability to another compute system, through a bus 540.

With particular regard to current acceleration structure building algorithms, scan converter 534 can use collection definition memory 528 for storage of voxels (e.g., functioning as cache 56 of FIG. 1). Collection definition memory 528 otherwise functions to collect a set of data against one or more keys, and can dispatch that set of data in packets. Packet slots to be filled with data from collection memory 28 can be retrieved from empty stack 530 and put into ready stack 526, which is read by scheduler 540, and contents of such packets distributed on the array of clusters 511 for performance. In one example rays are processed in packets, and collection definition memory 528 stores ray identifiers in collections that are each associated with a shape or shapes that are to be tested for intersection with rays identified in each collection.

The elements of the acceleration structure can be used to abstract larger numbers of primitives. Nothing in the example is to be considered limiting as to implementations that follow the operative principles and techniques outlined herein, problems that may be addressed, sought to be addressed, or a limitation on the usefulness of the disclosures to extrapolate, abstract them or apply them in a different context, to solve a different problem or otherwise make implementations thereof. Rather, the specificity provides a concrete example to be readily understood, and those of ordinary skill would be capable of adapting and learning from these disclosures in order to implement them in a particular setting. Various disclosures above describe determining certain conditions, characteristics or values; a person of ordinary skill would understand from these disclosures that such determining need not be exact, but rather to a precision sufficient for the circumstances.

Computer code and associated data can be provided for implementing certain parts of processes and other aspects described herein by configuring processors to execute instructions in performance of such processes or portions thereof. The computer code can comprise computer executable instructions that may be, for example, binaries, intermediate format instructions such as assembly language, firmware, or source code. The code may configure or otherwise cause to be configured a general purpose computer, a special purpose computer, or a special purpose processing device to perform a certain function or group of functions. Any such code can be stored in tangible machine readable media, such as solid-state drives, hard drives, CD-ROMs and other optical storage means, transiently in volatile memories, such as DRAM, or less transiently in SRAM.

A variety of implementations can be provided which can include interoperative hardware, firmware and/or software that can also be embodied in any of a variety of form factors and devices, including laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

For example, machines for according to these examples can comprise a 3-D scan converter using fixed-purpose circuitry, programmable elements for analyzing primitives, and memories for caching. Further machine components include communication links. An implementations of systems described herein can be a component of a larger system including other input and output devices, such as one or more application processors, network interfaces, disk drives or solid state drives, a display and so on.

In the above examples, the acceleration structure building components are a part of a system or machine that produces outputs that can be used for a variety of purposes, such as for rendering images in a video game, or a motion picture, or for storage or transmission to a user, and so on.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. Example processes may be described in a linear flow with a depicted sequence of process portions, but such description is for convenience, and some such portions can be performed concurrently or in a different order. Additionally, multiple threads can be performing each process portion, and different threads can be allocated to processing different portions of depicted processes. Additionally, functionality can be distributed differently or performed in components other than, additional to, or less than, those identified herein. Rather, the described features and steps are disclosed as examples of components of systems and methods within the scope of the appended claims.

What is claimed is:

1. A method of forming an acceleration structure, the method comprising: tracing a ray from a light source to identify a location in 3-D space of a 3-D scene at which one or more photons are to be deposited;
storing, in a memory, photon data for the one or more photons with respect to a plurality of voxels at a respective plurality of levels in a voxel hierarchy at the identified location in the 3-D space, such that photon data for a photon is added into to each of a plurality of voxels at a respective plurality of levels in the voxel hierarchy at the identified location in the 3-D space;
pruning one or more nodes representing voxels in the voxel hierarchy; and
using photon data associated with a voxel from the memory to produce an element of the acceleration structure representing the photon data associated with the voxel.

2. The method of claim 1, wherein said pruning one or more nodes comprises selectively pruning one or more nodes such that the nodes of the voxel hierarchy represent balanced numbers of photons.

3. The method of claim 1, wherein said pruning one or more nodes comprises selectively pruning one or more nodes such that the acceleration structure represents photons according to particular degrees of precision.

4. The method of claim 1, wherein said plurality of levels in the voxel hierarchy comprises every level of the voxel hierarchy.

5. The method of claim 1, wherein said pruning one or more nodes comprises traversing the voxel hierarchy in a top down manner, wherein for a current voxel being examined:
if a count of the number of photons present in the current voxel is greater than a first threshold then the current voxel is removed from the hierarchy; and
if a child voxel of the current voxel has less than a second threshold number of photons then the child voxel is removed.

6. The method of claim 1, wherein the identified location in 3-D space is an intersection location at which the ray intersects a shape in the 3-D scene.

7. The method of claim 1, wherein the method further comprises blending photons that are within a given voxel into a distribution, function or parameterized representation.

8. The method of claim 1, further comprising using the acceleration structure in a ray tracing process for rendering an image.

9. The method of claim 8, wherein said using the acceleration structure comprises performing photon queries on the acceleration structure.

10. The method of claim 1, wherein the operations of tracing a ray and storing the photon data are performed for a plurality of rays.

11. A ray tracing system comprising:
a memory; and
processing logic configured to:
trace a ray from a light source to identify a location in 3-D space of a 3-D scene at which one or more photons are to be deposited;
store, in the memory, photon data for the one or more photons with respect to a plurality of voxels at a respective plurality of levels in a voxel hierarchy at the identified location in the 3-D space, such that photon data for a photon is added into to each of a plurality of voxels at a respective plurality of levels in the voxel hierarchy at the identified location in the 3-D space;
prune one or more nodes representing voxels in the voxel hierarchy; and
use photon data associated with a voxel from the memory to produce an element of an acceleration structure representing the photon data associated with the voxel.

12. The ray tracing system of claim 11, wherein the processing logic is configured to prune one or more nodes by selectively pruning one or more nodes such that the nodes of the voxel hierarchy represent balanced numbers of photons.

13. The ray tracing system of claim 11, wherein the processing logic is configured to prune one or more nodes by selectively pruning one or more nodes such that the acceleration structure represents photons according to particular degrees of precision.

14. The ray tracing system of claim 11, wherein said plurality of levels in the voxel hierarchy comprises every level of the voxel hierarchy.

15. The ray tracing system of claim 11, wherein the processing logic is configured to prune one or more nodes by traversing the voxel hierarchy in a top down manner, wherein for a current voxel being examined:
if a count of the number of photons present in the current voxel is greater than a first threshold then the current voxel is removed from the hierarchy; and
if a child voxel of the current voxel has less than a second threshold number of photons then the child voxel is removed.

16. The ray tracing system of claim 11, wherein the processing logic is implemented in software.

17. The ray tracing system of claim 11, wherein the processing logic is implemented in fixed function hardware.

18. The ray tracing system of claim 11, wherein the memory is a cache, and wherein the cache is coupled to the processing logic.

19. The ray tracing system of claim 11, wherein the processing logic is further configured to use the acceleration structure in a ray tracing process for rendering an image.

20. A non-transitory computer readable storage medium having stored thereon a computer readable dataset description of a ray tracing system that, when processed causes the ray tracing system to be manufactured, wherein the ray tracing system comprises:

a memory; and processing logic configured to:

trace a ray from a light source to identify a location in 3-D space of a 3-D scene at which one or more photons are to be deposited;

store, in the memory, photon data for the one or more photons with respect to a plurality of voxels at a respective plurality of levels in a voxel hierarchy at the identified location in the 3-D space, such that photon data for a photon is added into to each of a plurality of voxels at a respective plurality of levels in the voxel hierarchy at the identified location in the 3-D space;

prune one or more nodes representing voxels in the voxel hierarchy; and use photon data associated with a voxel from the memory to produce an element of an acceleration structure representing the photon data associated with the voxel.

* * * * *